Figure 1:
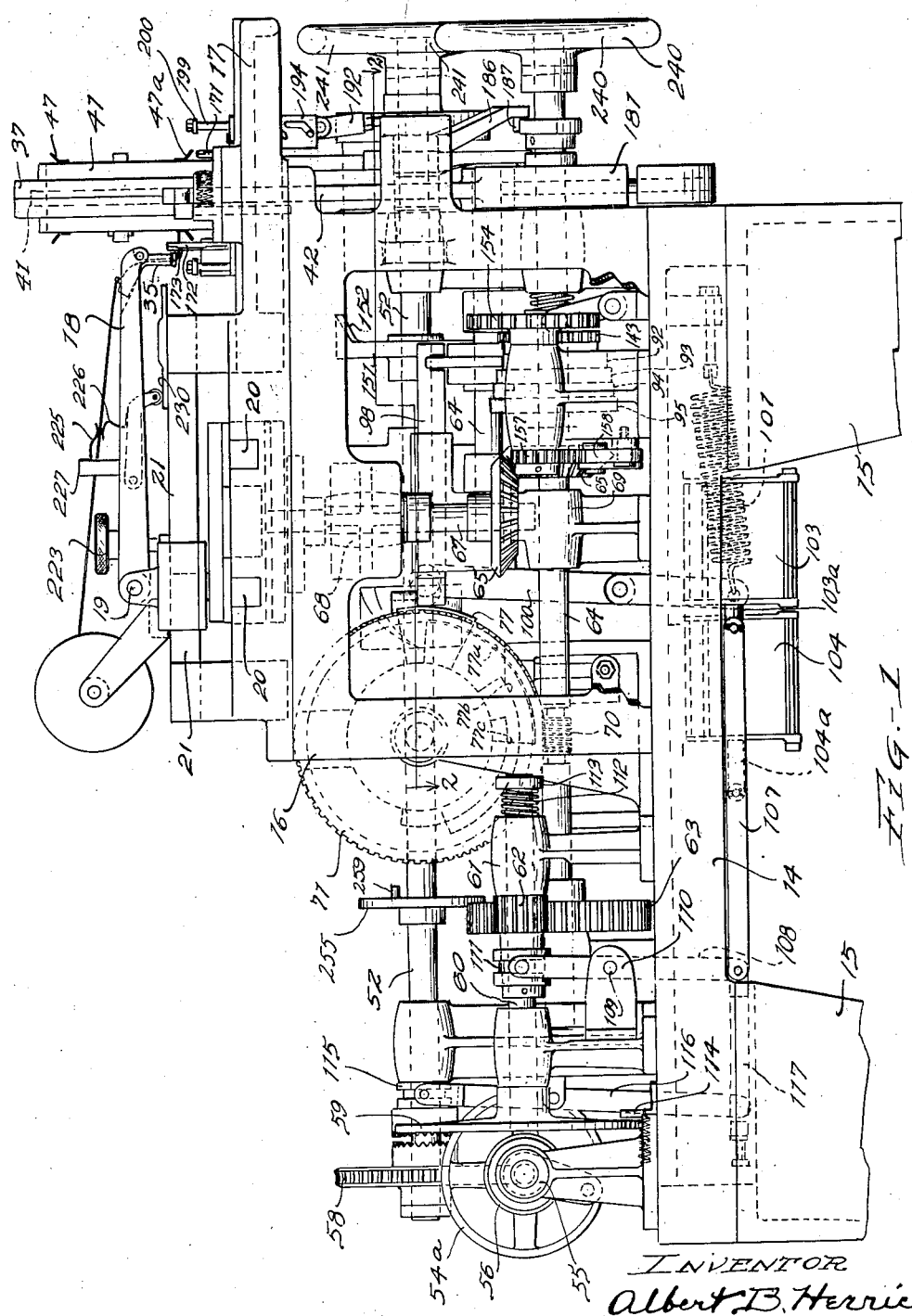

Aug. 10, 1926.

A. B. HERRICK 1,595,396

MOTOR STATOR WINDING MACHINE

Filed April 7, 1922  12 Sheets-Sheet 3

INVENTOR
Albert B Herrick,
BY
Bates & Macklin
ATTORNEYS

Aug. 10, 1926.

A. B. HERRICK 1,595,396

MOTOR STATOR WINDING MACHINE

Filed April 7, 1922  12 Sheets-Sheet 4

INVENTOR
Albert B. Herrick,
By Bates & Macklin,
ATTORNEYS

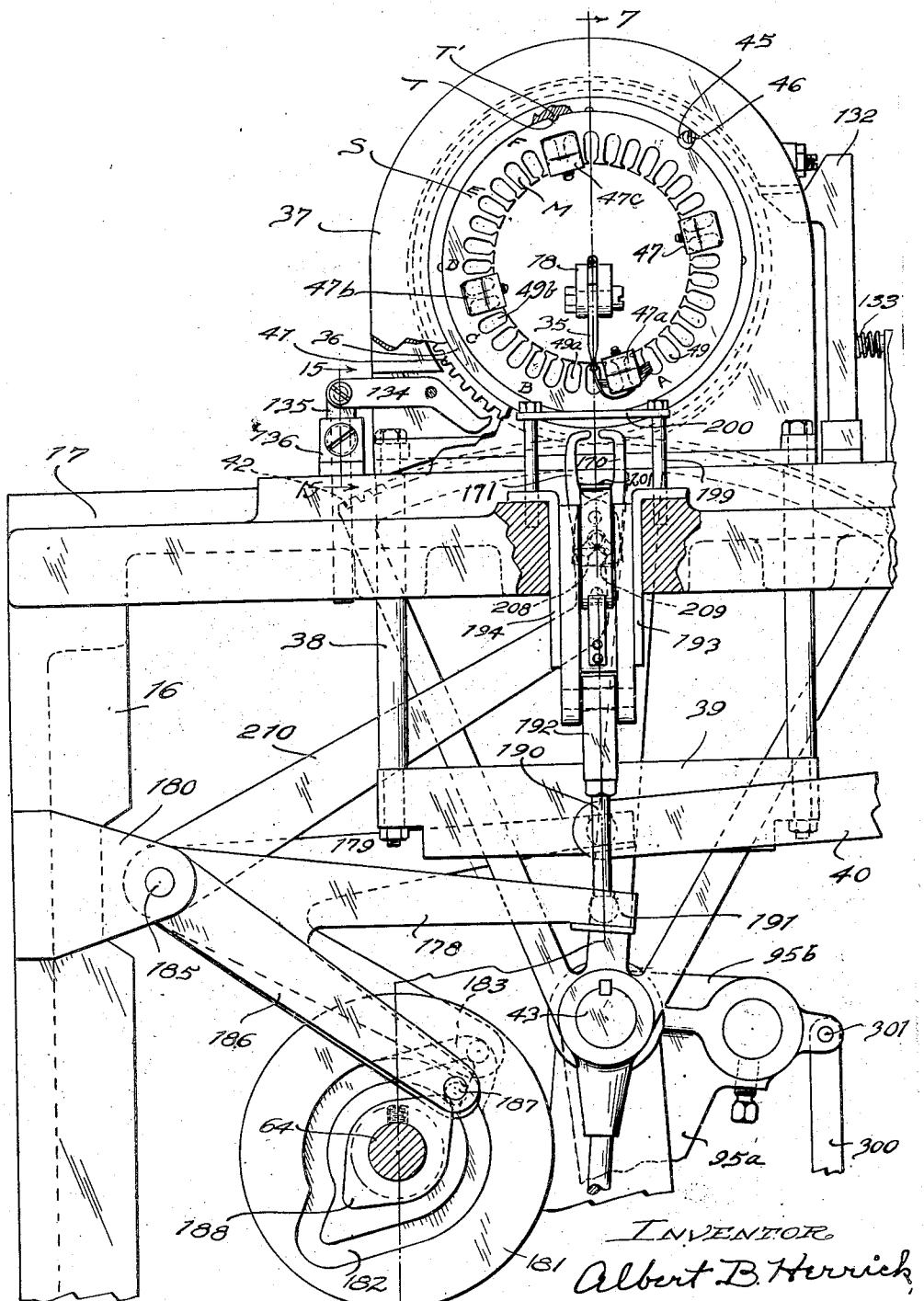

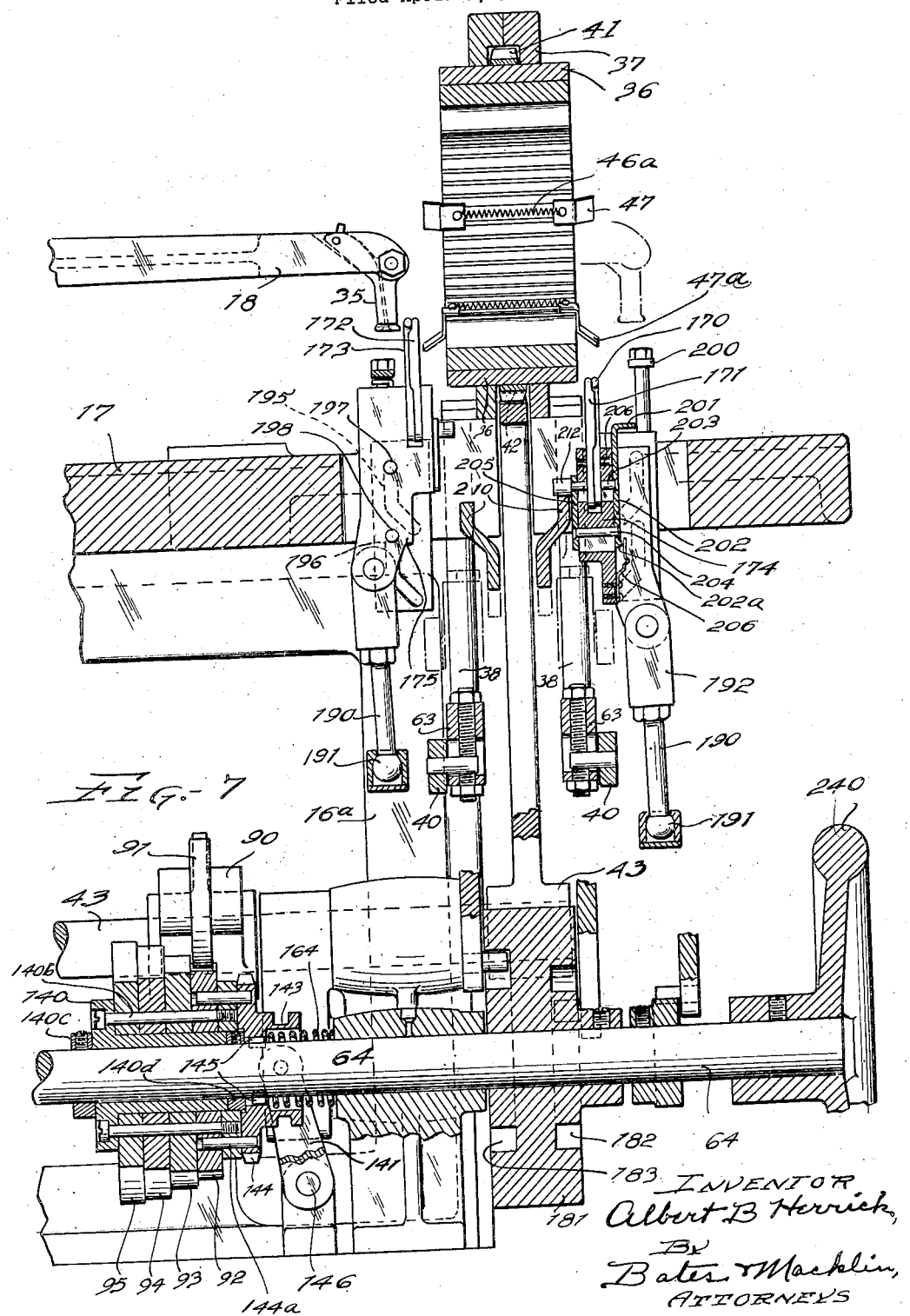

Aug. 10, 1926.

A. B. HERRICK 1,595,396

MOTOR STATOR WINDING MACHINE

Filed April 7, 1922   12 Sheets-Sheet 7

INVENTOR
Albert B. Herrick,
By Bates & Macklin,
ATTORNEYS

INVENTOR
Albert B. Herrick,
By Bates & Macklin
ATTORNEYS

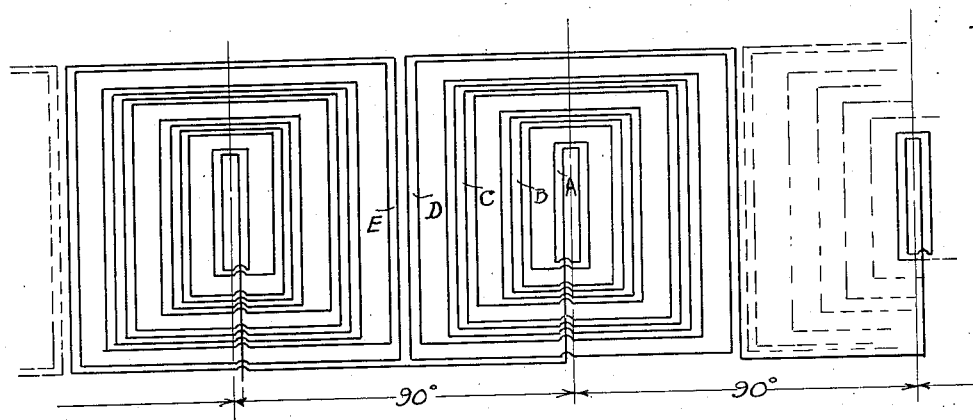
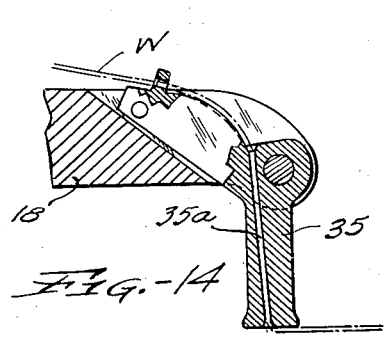
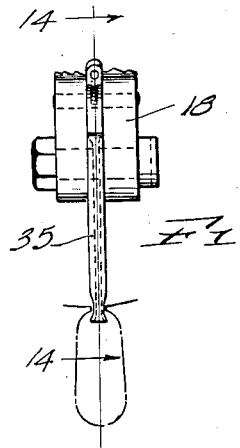
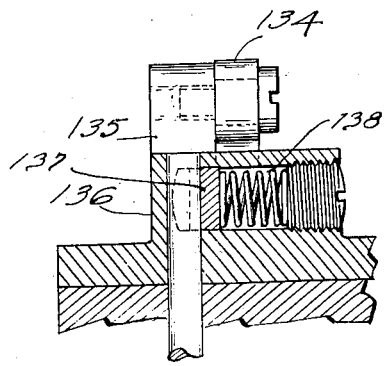
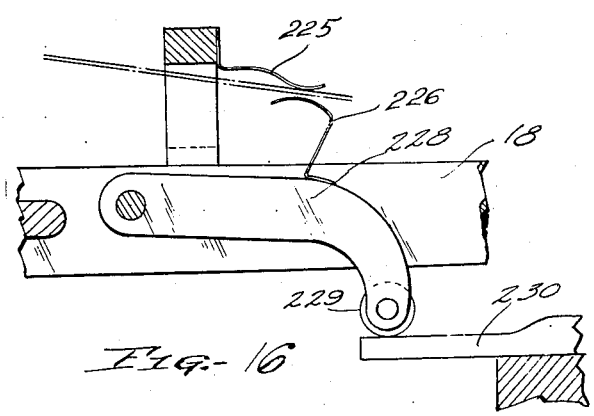

Aug. 10, 1926.

A. B. HERRICK

MOTOR STATOR WINDING MACHINE

Filed April 7, 1922    12 Sheets-Sheet 10

1,595,396

INVENTOR
Albert B Herrick,
By Bates & Macklin,
ATTORNEYS

Aug. 10, 1926.

A. B. HERRICK 1,595,396

MOTOR STATOR WINDING MACHINE

Filed April 7, 1922  12 Sheets-Sheet 11

INVENTOR
Albert B. Herrick

By
Bates & Macklin
ATTORNEYS

Aug. 10, 1926.
A. B. HERRICK
1,595,396
MOTOR STATOR WINDING MACHINE
Filed April 7, 1922   12 Sheets-Sheet 12
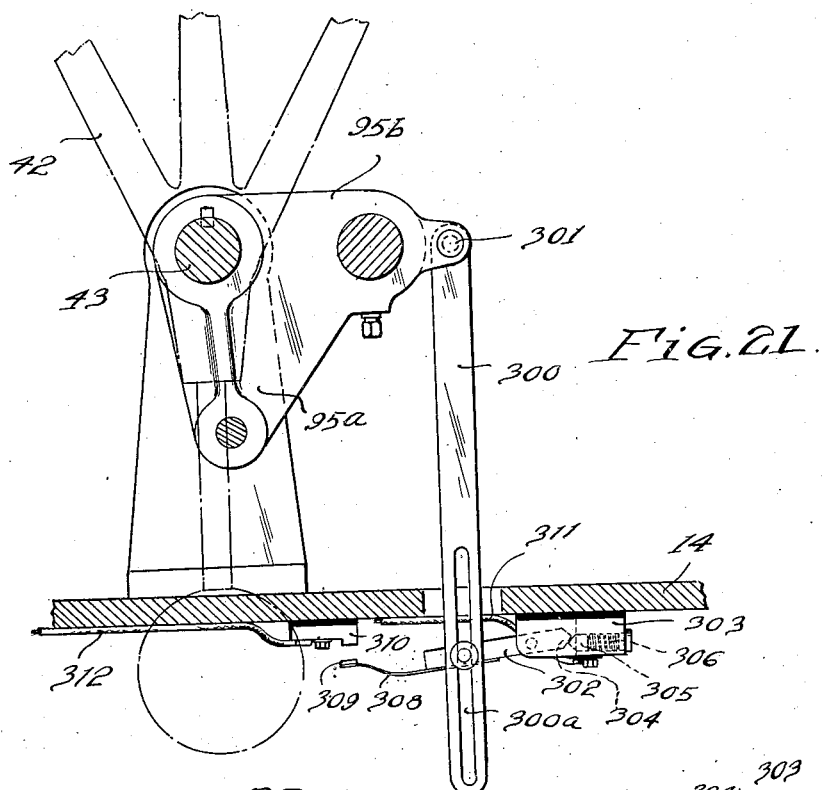
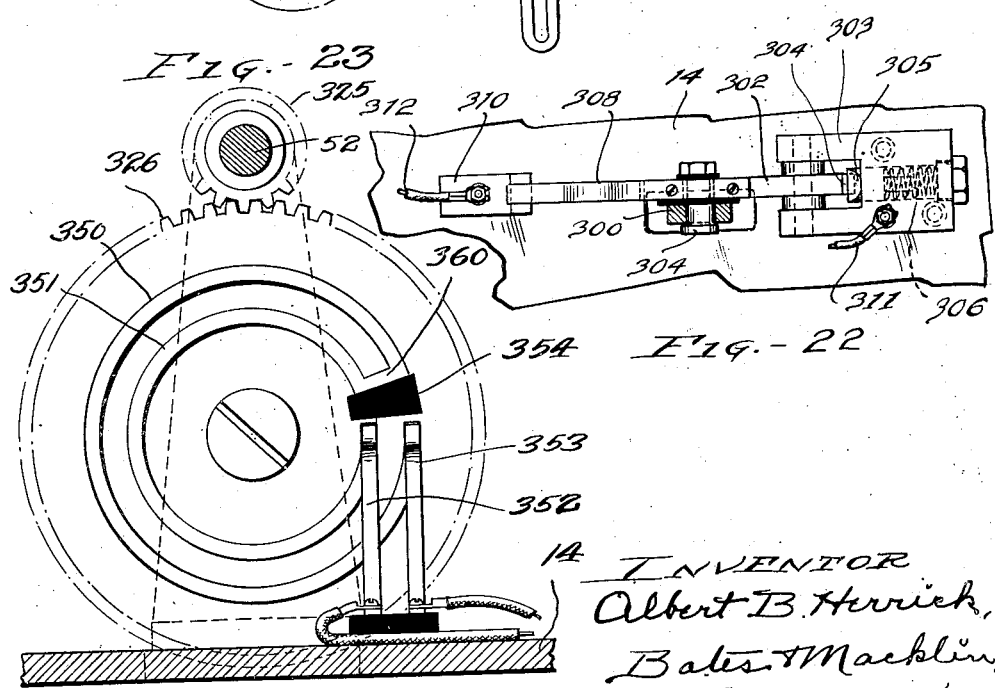

Patented Aug. 10, 1926.

1,595,396

UNITED STATES PATENT OFFICE.

ALBERT B. HERRICK, OF CLEVELAND, OHIO.

MOTOR-STATOR-WINDING MACHINE.

Application filed April 7, 1922. Serial No. 550,314.

This invention relates to winding machines, and is particularly concerned with automatic mechanism for forming and positioning coils of cord or wire in predetermined turns and relationships, one to another, and to holding means for such coils.

The objects of my invention include the provision of such a winding mechanism for effecting the formation of a plurality of field coils for electric motor stators or generator stators and this present invention is adapted for use in winding the coils into slotted field frames whereby each loop of the coils may be permanently wound and positioned directly upon the frame by my mechanism.

Another object of my invention is the provision of an automatic machine adapted to hold a frame for receiving the windings and move the frame in timed relation to a winding arm which guides the cord or wire under proper tension when the coils are being formed upon said frame.

A further object of the present invention is the arrangement of indexing and counting mechanisms in association with a motor frame and winding arm actuating mechanisms, whereby the machine may automatically wind a complete series of field coils on a motor frame without requiring the attention of an operator after the frame has been positioned in the machine.

A further, more specific, object of the present invention is the provision of means in an automatic winding machine for drawing portions of wire loops of the respective coils away from the center of a receiving frame, and compactly positioning the turns of the loop sections and causing the end portions of the coils to have desired clearances and occupy minimum space.

An additional object of my invention is the provision of wire tensioning means for intermittently exerting tension on the wire when certain portions of the loops are being formed.

Another object of my invention is the provision of automatic means for effecting a reversal of the winding action of the cooperating elements of the machine whereby a group of field coil sets may be wound clockwise while a succeeding group may be wound counter-clockwise.

A still further object is the provision of a field winding mechanism which while being automatically responsive to the control of associated coil counting and stator frame indexing mechanisms nevertheless effectively winds the field coils directly upon the stator frame at a high rate of speed without destroying the wire insulation.

Other objects will be hereinafter set forth in the following description of a preferred embodiment of my invention, which is illustrated in the drawings. The essential characteristics are summarized in the claims.

Figure 2:
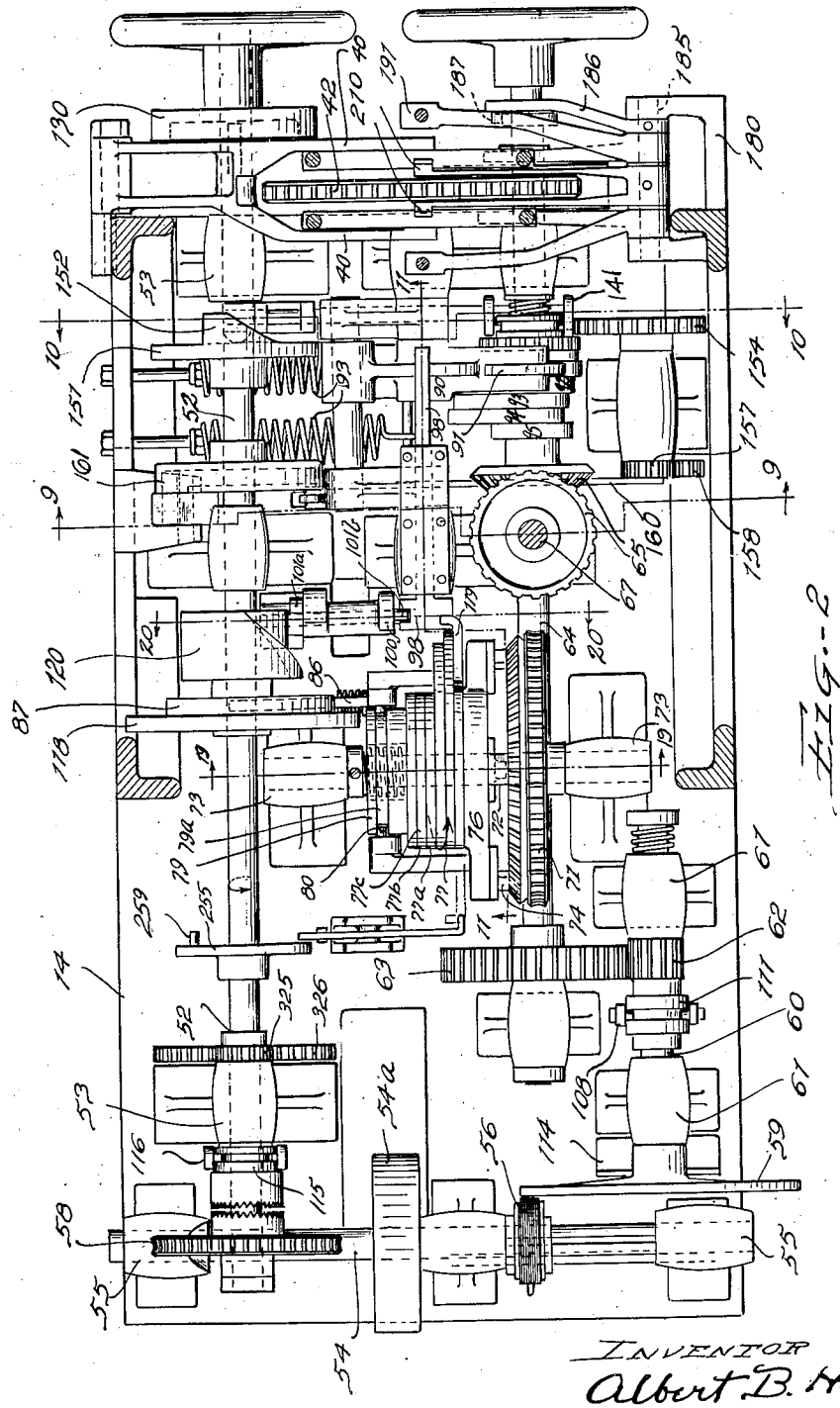
Figure 3:
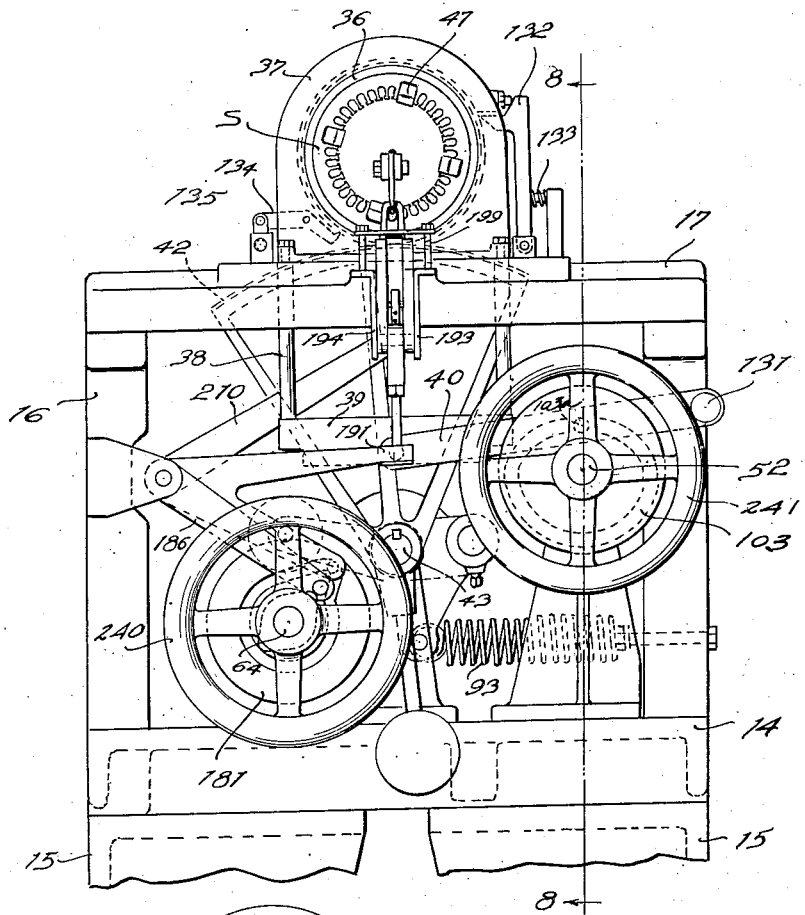
Figure 5:
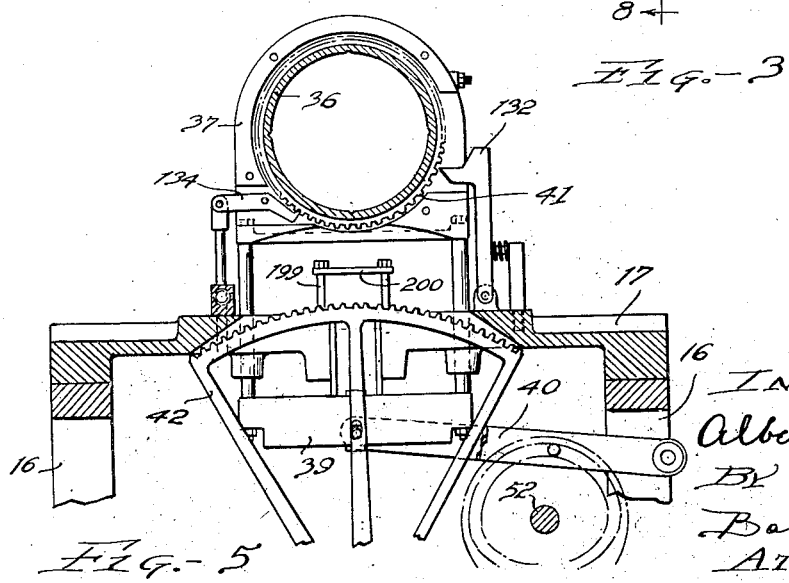
Figure 4:
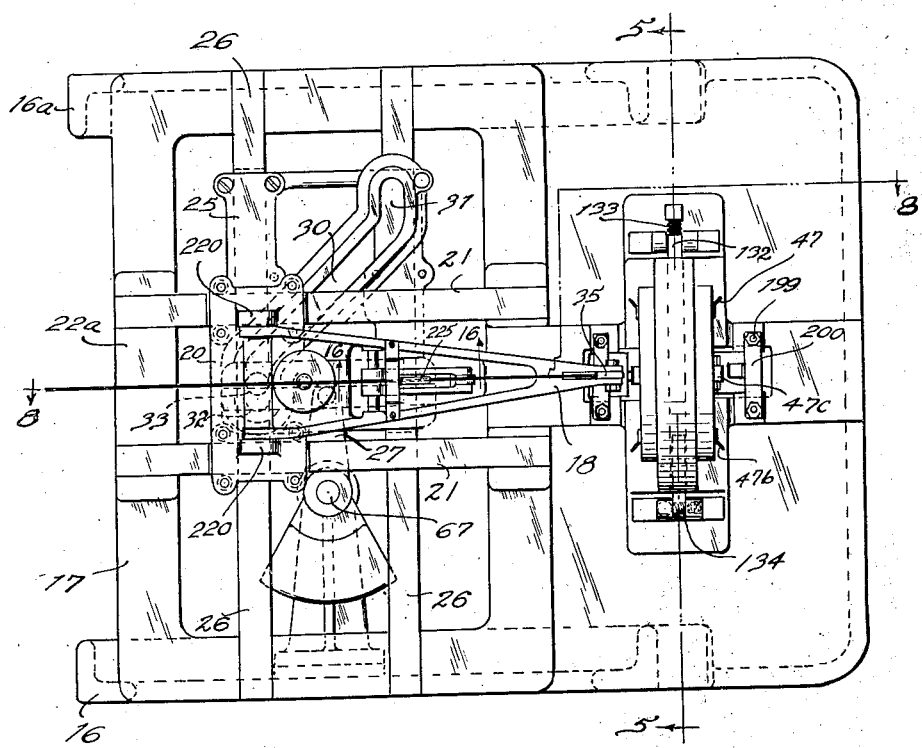
Figure 11:
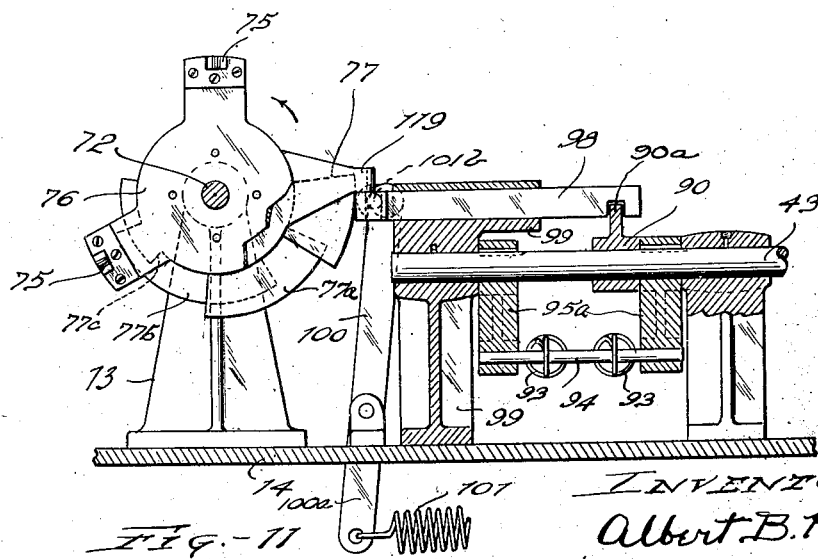
Figure 8:
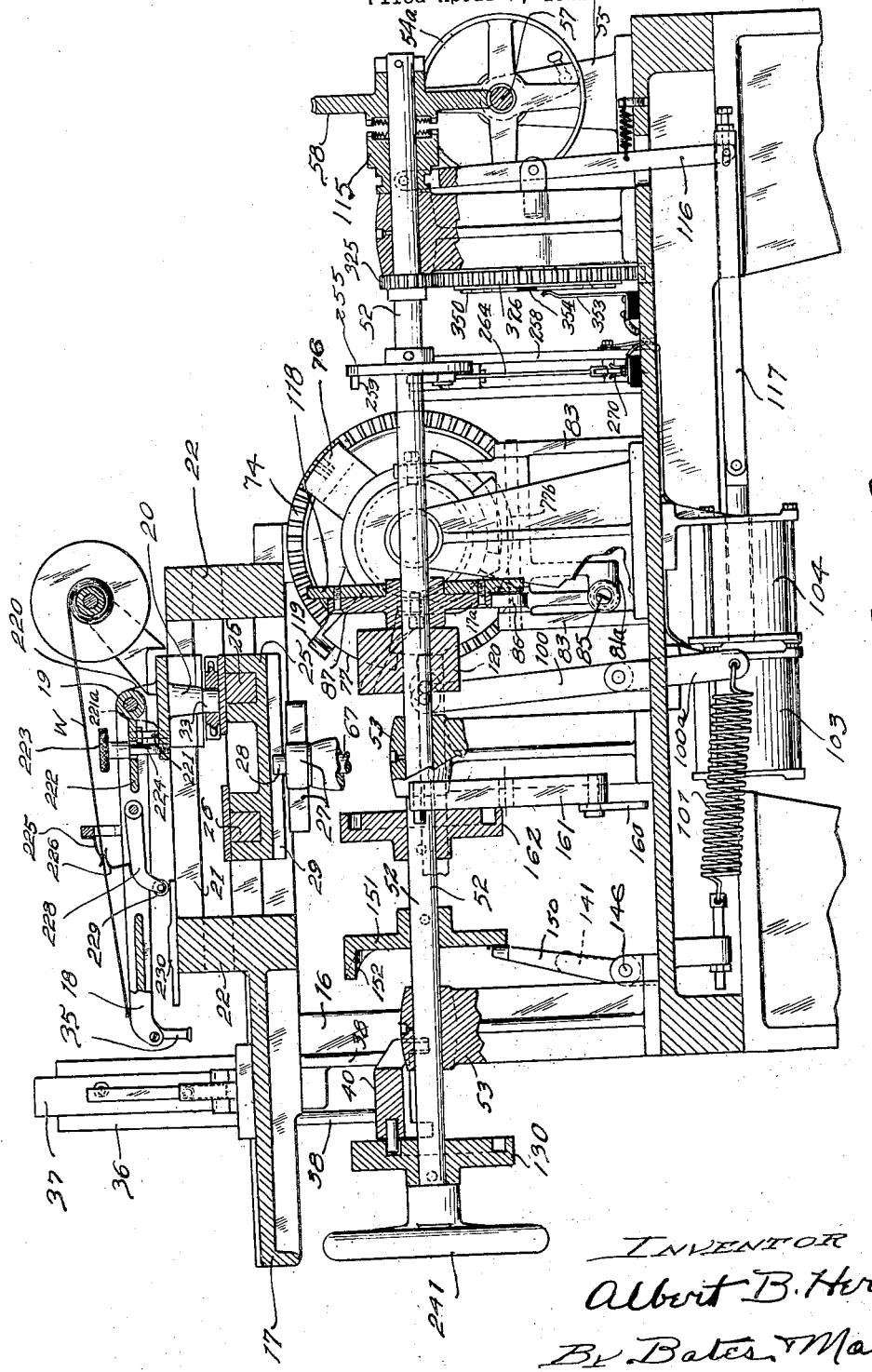
Figure 9:
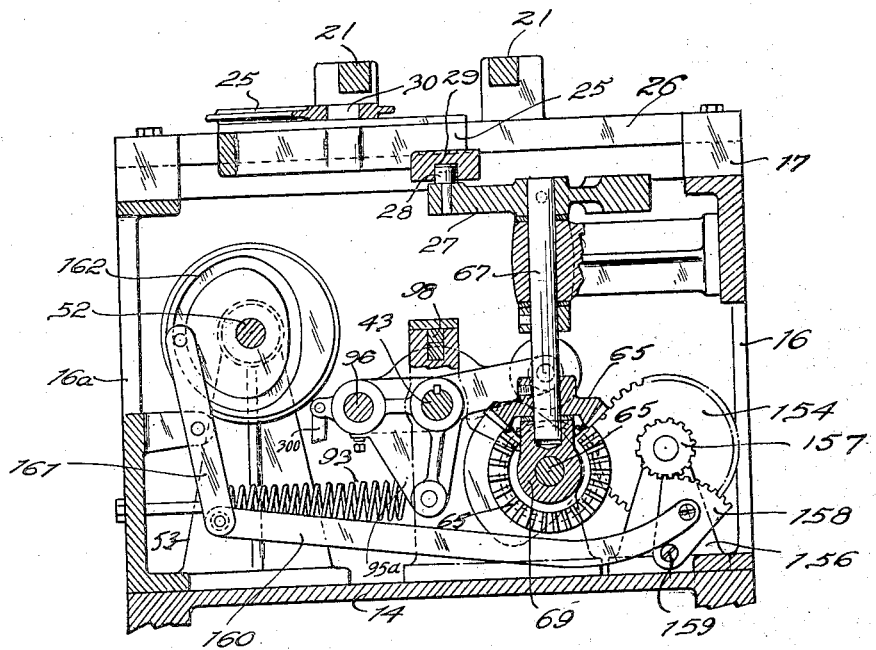
Figure 10:
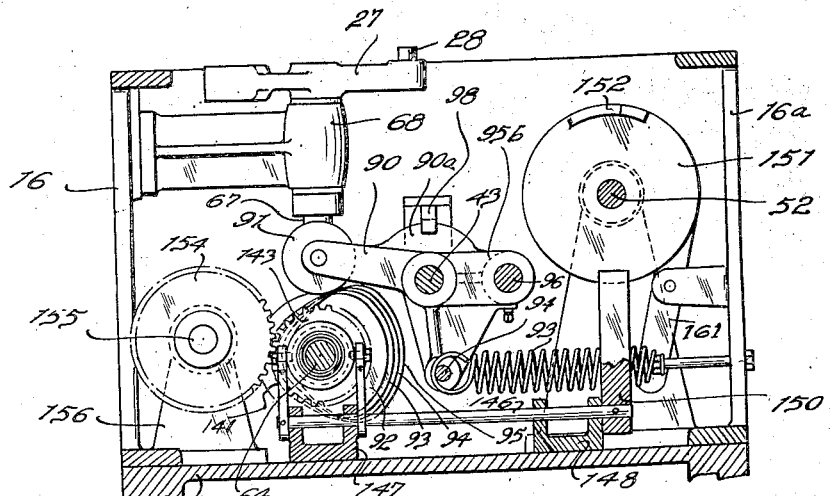
Figure 17:
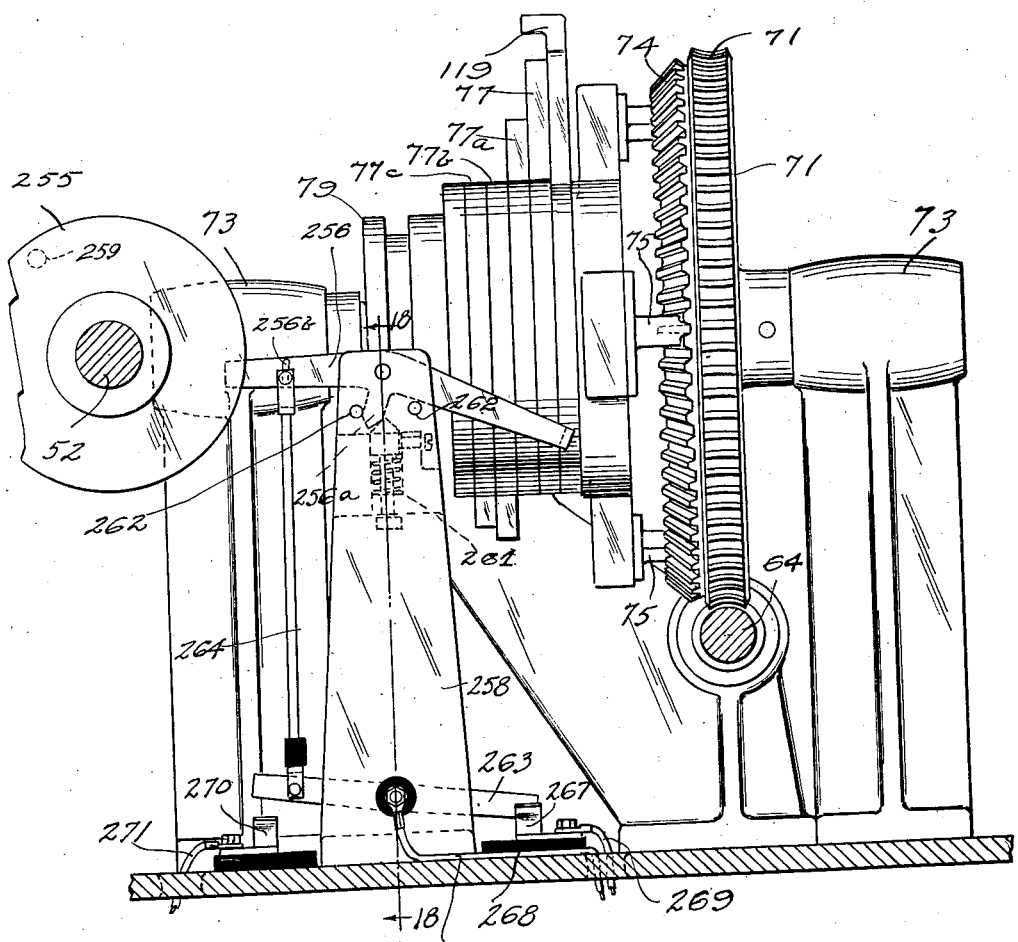
Figure 18:
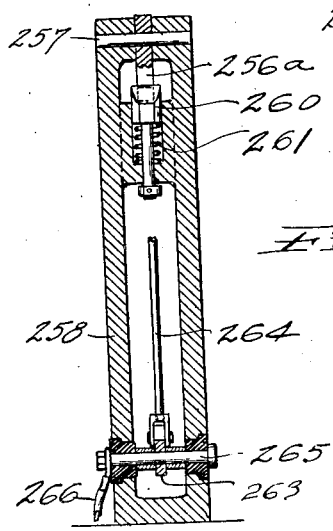
Figure 19:
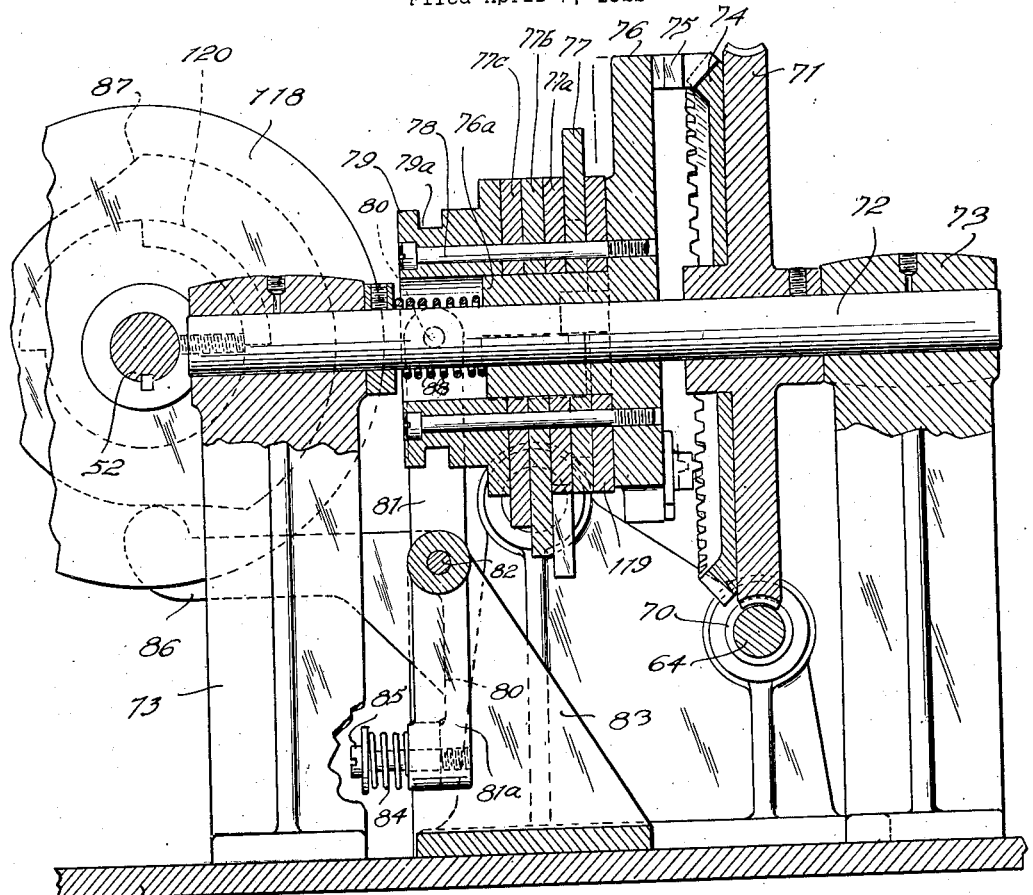
Figure 20:
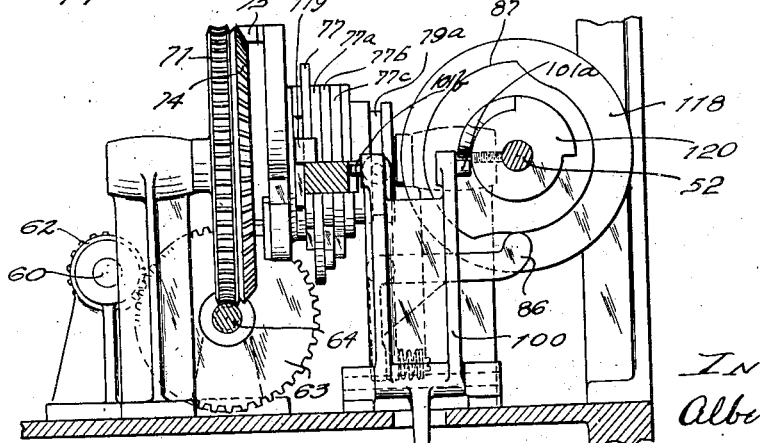

In the drawings, Fig. 1 is a side elevation of my automatic winding machine; Fig. 2 is a sectional plan view of the machine taken along the line 2—2 of Fig. 1; Fig. 3 is a front elevation of the machine as viewed from the winding end thereof; Fig. 4 is a plan view of the field frame support and winding arm mechanism; Fig. 5 is a sectional elevation taken substantially along the line 5—5 of Fig. 4; Fig. 6 is an enlarged fragmentary elevation of the field frame support and mechanism which acts thereon: Fig. 7 is an enlarged fragmentary sectional elevation taken substantially along the line 7—7 of Fig. 6; Fig. 8 is a cross sectional elevation taken along the line 8—8 of Fig. 3; Fig. 9 is a transverse section taken along the line 9—9 of Fig. 2; Fig. 10 is a transverse section taken along the line 10—10 of Fig. 2; Fig. 11 is a sectional elevation taken along the line 11—11 of Fig. 2; Fig. 12 is a diagrammatic representation of a four pole motor field winding. Fig. 13 is an end elevation of the wire laying guide; Fig. 14 is a section taken through Fig. 13 substantially along the line 14—14 of Fig. 13; Fig. 15 is a cross sectional view taken substantially along the line 15—15 of Fig. 6; Fig. 16 is a cross sectional view taken along the line 16—16 of Fig. 4; Fig. 17 is a side elevation of a synchronizing switch mechanism; Fig. 18 is a cross sectional view substantially along the line 18—18 of Fig. 17; Fig. 19 is a longitudinal section through the counting cams on the line 19—19 of Fig. 2; Fig. 20 is a sectional elevation of this same cam mechanism as indicated by the line 20—20 of Fig. 2; Fig. 21 is a sectional elevation showing an intermittently operable switch mechanism for controlling the oscillatory movement of the stator rocking mechanism; and Fig. 22 is a plan of the same; Figure 23 is a cross-sectional detail of a stop switch mechanism for stopping a driving motor.

For the purpose of clearly setting forth my invention but not in limitation thereof, I will describe my machine as adjusted and arranged to wind the field coils of a relatively small motor wherein there are twenty-eight sections of coils of insulated wire, each group of coils being arranged in four distinct sets filling substantially 90° of the slots formed in the field frame. The diagram of such a field winding is illustrated in Fig. 12, as having a coil A formed about the center line of one pole and consisting of thirteen wire loops, while a surrounding coil B is formed wtih loops extending adjacent the loops in the coil A but comprising twenty-six in number. The coil C has a similarly arranged set of twenty-six loops. The largest coil D may have but thirteen loops for a purpose which will be presently described. This group of four sets of coils comprises one pole of the stator field. A set E of thirteen loops in the next group of field coil sets is shown as being superposed over the loops of set D, thus the effective stretches of the respective coil sets E and D will total twenty-six strands.

The motor frames are usually constructed of a number of thin sheet metal punchings, or laminations having coincident notches or teeth which, when the punchings are assembled, form grooves or interstices on the interior of the field frame and extending parallel with the axis thereof. These grooves comprise uniform spaces in which the field coils are placed.

The prevailing practice in forming coils is to wind the coils in the form of skeins and manually insert these into the grooves or slots in the field frame.

In accordance with the objects of my invention, I have devised an automatic machine to act upon a field frame of an electric motor and which may be positioned in an oscillating cradle that is actuated in timed relation with a reciprocating arm carrying a wire laying guide; the latter member being arranged to move in a path which passes through the central opening of the motor frame.

To effect the complete formation of all the field coils automatically, I have provided a counting mechanism for determining the exact number of loops formed in each set of coils and an automatically operative mechanism for quickly changing the degree of angular oscillation of the field frame at the completion of each set of coils. I also provide pairs of gripper members co-operating with the wire guide for drawing the side portions of each loop of each set of coils downwardly and against the respective faces of the field frame. A timing mechanism for determining the stopping periods of the wire winding arm and attendant mechanism and a mechanism for resetting the coil counting mechanism to an initial position when the field frame is being indexed will be presently described in conjunction with a description of the coordinating mechanisms which cause the machine to function as an automatic unit.

In the drawings, I have illustrated the various mechanisms comprising a complete winding machine as supported upon a frame including a bed plate 14 shown as positioned on standards 15, (Fig. 1). The bed 14 serves as a support for various bearing brackets, as well as a support for another frame member 16 upon which an upper top frame member 17 is surmounted.

The frame member 17 is formed in the nature of a slide support for a reciprocatory wire laying arm 18 pivotally carried at 19 by a slide frame 20; the latter member resting and sliding upon bars 21 rigidly secured to a raised flanged portion 22 of the frame member 17, (Figs. 4 and 8).

The slide member 20 and arm 18 are reciprocated by a transversely movable slide member 25, which is also mounted upon suitably spaced slide bars 26 shown as supported by the flange 22 beneath the bars 21. The latter slide member is actuated by a counterbalanced crank arm 27 and crank pin 28 (Figs. 4 and 8) which engages the slide member 25 along a suitable slot 29 (Figs. 8 and 9) formed in the under face of the slide frame 25; the mechanical operation being somewhat in the nature of that of a Scotch yoke. The slide frame 25 has a diagonally extending slot 30 formed therein terminating in extensions 31 and 32 which are parallel with the slide bars 26. A roller 33 mounted on a suitably supported pin depending from the under side of the frame member 20 is arranged to move along the slot 30 of the slide 25, whereby a transverse movement of the slide member 20 and consequently a corresponding movement of the wire laying arm 18 is effected. Substantial dwells will take place between the reciprocatory movements of the wire laying arm during the period when the roller 33 is traversing the elongations 31 and 32 of the slot 30.

I have provided means for the supporting and oscillating of the motor stator in such a position on the machine that the intermittent reciprocatory movements of the wire laying arm may traverse the stator during corresponding dwells in the oscillating movements of the stator whereby a wire guide member 35 (hereinafter termed the "guide") may travel along the respective slots of the stator and lay the wire therein and during rocking movements of the stator may lay the wire along the opposite faces thereof.

Upon the extreme outer end of the arm 18 is the hollow wire guide 35 through which the wire W may pass. The guide as well as the supporting arm 18 cooperate with an oscillating cradle 36 which is centrally positioned relative to the arm 18 and is adapted to receive a stator S as shown in Figs. 3 and 6. The cradle member 36 is oscillated in a bearing frame 37 by actuating means to be presently described. The latter member is arranged to be elevated by depending rods 38, extending through the frame member 17 and bearing therein, while a bridge member 39 is secured to the lower extremities of the rods and connect lever 40 thereto. The object of elevating the bearing frame 37 will be presently set forth.

The required oscillatory movement of the stator cradle 36 is imparted through a gear 41 comprising a part of the cradle and a fan gear 42 meshing therewith and mounted on a central shaft member 43 disposed intermediately of the machine bed 14 and the top frame member 17.

Mechanisms for varying and controlling the oscillatory movement of the cradle 36 and the reciprocatory movement of the wire laying arm 18 will now be described.

As it is important that the stator frame S be positioned in the cradle with one of the slots M thereof in alignment with the path of the wire laying guide 35, a gauging notch T (Fig. 6) may be formed on the outer circumferential surface of the stator S, into which a cradle lug T' may fit. Any suitable clamping means, such as an overhanging clamp plate 45 and screw 46, may serve to prevent a shifting of the stator frame when once positioned in the cradle. In Figs. 3 and 7 are shown loop hooks 47 under which the wires are caught. These hooks may be removably secured, on the opposite faces of the stator in positions which are 90° apart, by spring members 46ª, which, while exerting sufficient tension on the hooks to maintain them in place during the winding operations, may yield sufficiently under manual exertion to permit removal of the hook members when the field winding has been completed. The first hook may be placed on the stator in radial alignment with the exterior gauging slot T and the other hooks may then be uniformly spaced therefrom. whence the hook 47ª, will be disposed at one side of the path of the wire laying guide 35 when the winding operation is started.

At the beginning of the winding operation, the extent of the oscillatory movement, imparted to the stator cradle by the fan gear 42, is equal to the angle which extends from the center of one slot, to the center of the fourth slot. The two intervening slots shown as covered by the loop hooks 47, may be subsequently filled by starting coils, with the winding and assembling of which this description need not be at present encumbered.

The condition existing after the completion of several of the loops in the first coil is illustrated in Fig. 6. Upon the completion of a certain number of reciprocatory movements (in the example being used, thirteen) of the arm 18 and corresponding oscillatory movements of the stator cradle 36, the angular movement of the cradle 36 is increased so that the guide 35 will lay wire in the adjacent slots 49 and 49ª (Fig. 6) the increase in the oscillatory movement being brought about at such a time, that without loss of movement this larger coil is started in the same winding direction as the first coil.

Upon the completion of this second set of coils, a further increase in the oscillatory movement in the stator is brought about by an increase in the angular movement of the fan gear 42, etc., until four sets of coils, comprising one pole of the field, is completed. The stator is then indexed by mechanism, which is independent of the fan gear 42, whereby a second pair of hook members 47ᵇ are positioned adjacent the path of the wire laying guide and a second pole is started as before, but the relationship of the shifting members is such as to reverse the winding direction.

The means for determining the exact number of turns in each coil and the means for increasing the angular oscillation of the stator cradle, as well as the means for laying the transverse portion of the loops in each set of coils compactly against the opposite sides of the stator frame will be subsequently described.

The timing mechanism for the machine is arranged in two groups, one group being associated with means for driving the guide and arm 18, and the other group comprising a series of cams arranged on a shaft 52 positioned at one side and extending longitudinally of the machine. The shaft 52 is mounted on suitable bearings 53 which are supported by the machine bed 14.

A transverse drive shaft 54 is similarly mounted on bearings 55 and carries members arranged to intermittently impart motion to means for resetting the timing mechanism, and the means for reciprocating the guide arm 18. These members being a pulley designated 54ª (Fig. 2) driven by a motor disposed beneath the bed 14, a friction drive pinion 56 splined thereto, and a worm 57 meshing with the worm wheel 58 which is mounted on the rear end of the shaft member 52. The friction pinion 56 drives a friction disc 59 positioned on a shaft 60, the latter shaft being supported on bearings 61 which are secured to the bed of the machine. The shaft 60 is arranged to be shifted longitudinally in the bearings 61, whereby the friction disc 59 may be shifted into and out of driving engagement with the friction pinion 56. A pinion 62 is mounted on the shaft 60 and intermeshes with a spur gear 63 carried on a shaft 64 which drives intermeshing mitre gears 65.

One of the mitre gears is mounted on the end of a vertically disposed shaft 67 supported by a bearing 68 which is secured to the machine frame member 16, as illustrated in Figs. 9 and 10. The lower end of the shaft member 67 may rest in a bearing 69 which also serves as a bearing for the shaft member 64. The upper end of the vertical shaft member 67 may be rigidly secured to the crank lever 27 which has already been described as actuating the transversely movable slide 25. Hence the reciprocatory movement of the wire laying arm 18 is effected by the rotation of the friction disc 59, shaft 60, gears 62 and 63, shaft 64, mitre gears 65, and vertical shaft 67 which rotates the arm 27, causing transverse movement of the slide 25, by the sliding of the roller 28 in the slot 29 thereof; this latter movement in turn causing longitudinal reciprocation of the slide member 20 by means of the engagement of the roller 33 in the slot 30. See Figs. 1, 4, 8 and 9.

The shaft member 64 carries a worm 70 which meshes with a worm wheel 71 mounted on a transverse timing shaft 72 supported by bearings 73 which are secured to the machine bed 14. A bevel gear 74 may be secured to the side face of the worm wheel 71 and is arranged to be engaged by lugs 75 which are secured to the flange 76ª of the sleeve 76 which is loosely mounted on the shaft member 72. The sleeve carries a series of loop coil counting cams 77, 77ª, 77ᵇ and 77ᶜ. (Figs. 11 and 19) the contour of which determines the number of turns in the various field coils being wound by the wire laying arm 18, as will be hereinafter described. The cams are maintained in rigid relation with the sleeve 76 by a screw member 78 which also serves to secure a grooved collar member 79 on the end of the sleeve 76.

The elements cooperating with these "counter" cams to control the number of oscillations of the winding mechanism and the successive shiftings to start new coils, will now be described.

A lever 81 has a downwardly extending portion 81ª having a spring member 84 positioned thereon, and acting upon a screw member 85 which extends through the end of the lever portion 81ª and engages the lower extremity of bell crank lever 86. The lever 86 is arranged to coact with a disc cam 87 which is in rigid relation with the shaft member 52. As the cam member 87 depresses the lever 86, the spring member 84 is compressed and exerts pressure upon the bifurcated lever 81, causing a movement of the latter which shifts the collar 79, cams 77, 77ª, 77ᵇ and 77ᶜ and sleeve 76 longitudinally of the shaft member 72, thus drawing the lugs 75 out of engagement with the teeth of the bevel gear 74. A spring member 88, mounted on the shaft 72 interiorly of the collar 79, acts to shift the foregoing movable members to a normal operating position when a depression, formed in the cam 87, permits an upward movement of the lever 86. A partial revolution of the shaft 72 rotates the cams 77, 77ª, 77ᵇ and 77ᶜ through successive angular positions which correspond to the periods in which the wire laying arm 18 effects the winding of each set of coils. The cams cooperate with other mechanisms to increase the oscillatory movement of the stator frame immediately upon the completion of the winding of each set of coils, until the last coil of a group whereupon the counting mechanism is reset, and the stator is indexed to begin a new group of coils.

Since the angular movement of the field frame is increased at the completion of successive coils, the angular movement of the fan gear 42 should be increased proportionately. This increase is brought about by increasing the angular movement of the shaft 43 upon which the fan gear is mounted. The shaft 43 is actuated by lever 90, cam follower 91 and step cams 92, 93, 94 and 95, which are coaxially mounted on the drive shaft 64. The lever 90 is oscillated by the cam 92 during the period the first set of coils is being formed, the contour of the cam and the relative leverages of the arms of the lever 90 being such as to produce the proper angular oscillation of the field frame cradle 36.

Upon the completion of one set of coils the lever 90 and follower 91 are shifted rearwardly into position to be actuated by the cam 93 which is of sufficiently greater size to produce the desired increase in the angular movement of the fan gear 42 and consequently the motor field frame. This shifting is brought about at a time when the cams are in such a position relative to the cam follower 91 as to present common longitudinal cam surfaces along which the follower may slide.

The follower 91 is maintained in contact with the cams by a pair of heavy spring members 93 engaging a rod member 94 which is supported by downwardly extending lever members 95ª; the latter members being rigid with the shaft member 43. The lever 90 is slidably mounted on the shaft 43 intermediate the lever members 95ª. The lever members 95ª are connected to the lever 90 by a stud 96 which is supported on extensions 95ᵇ; the lever 90 having a similar extension 90ᵇ in slidable engagement with the stud 96. Thus the lever 90 is in reality slidably mounted on the shaft 43 and stud member 96 and imparts an oscillatory movement to the shaft 43 through the stud 96 and lever members 95 which are keyed thereto.

The shifting of the lever 90 is effected by a square shaped plunger member 98 which has the outer under portion thereof slotted to effectively engage the arcuate portion 90ᵃ of the lever member 90 while permitting oscillation of the lever. The plunger 98 is mounted in a suitable slideway formed in the upper portion of a bearing member 99 which also supports the inner end of the shaft member 43. The inner end of the plunger member is widened to present a cam contacting surface which is substantially equal to the combined width of the counting cams 77, 77ᵃ, 77ᵇ and 77ᶜ and is maintained in contact therewith by a lever member 100. The lever member is pivotally mounted on a suitable bracket secured to the machine bed 14, and is actuated by a spring member 101 disposed beneath the machine bed and in engagement with a downward projection 100ᵃ of the lever which extends through the bed. (See Figs. 2, 19 and 20.)

The arcuate span of each of the cams 77, 77ᵃ, 77ᵇ and 77ᶜ, as hereinbefore stated, corresponds to the angular movement of the shaft 72 during the formation of 13 or 26 coils, as the case may be. Upon the completion of the exact number of reciprocations of the wire laying arm 18 each of the cams will have rotated out of contact with the end of the plunger 98 and the latter member will have dropped to the succeeding cam. Since the cams are uniformly decreased in radial dimensions a distance corresponding to the width of the oscillator cams 92, etc., the spring 101 effects the shifting of the lever 90 to the next oscillator cam at a definite period in the revolution of the shaft member 64.

This shifting action of lever 90 is repeated upon the completion of each set of coils in one field quadrant and upon the completion of the formation of all the field coils in one quadrant the counting cams 77, 77ᵃ, 77ᵇ and 77ᶜ, and lever 90 are reset to initial position, whence the foregoing described winding and counting operations are repeated during the formation of the field windings which constitute another quadrant of the field. The resetting of the counting cams and sleeve 76 is occasioned by rotation of the shaft 52.

When the shaft member 52 is rotated, the cam member 87 depresses the lever member 86 resulting in the shifting of the sleeve 76 along the shaft 72 and the counting cams are disconnected from the mechanism which drives the arm 18. The end face of the collar 79 is brought into engagement with a friction disc 118 which causes the sleeve to rotate in a reverse direction until a projecting member 119, in rigid relation with the cams, strikes the upper surface of the plunger member 98, thus preventing a further rotation of the sleeve 76 by the friction disc 118. Prior to the reverse rotation of the sleeve 76 by the friction disc 118, however, the plunger member 98 is positively shifted away from the cams by pressure exerted upon the lever 100 by a drum cam 120, which is mounted on the shaft 52 and is positioned to engage a pin 101ᵃ projecting from the lever member 100, as shown in Figs. 2 and 20 there being a pin 101ᵇ on the opposite arm of the lever in engagement with a slot in the plunger 98. The stopping of the shaft 64 is effected at the time the cam follower 91 is on the high portion of the cam 95 and upon the resetting of the cam follower to its first position, it drops successively from one cam to another. Hence an easy shifting movement of the lever 90 and cam follower 91 is obtained when the plunger 98 is shifted forwardly by the lever 100. This shifting action takes place immediately after the fan gear 42 is brought to rest.

It is important that the stator frame carrier be indexed a sufficient angular amount to bring one of the slots which is adjacent to a pair of the hook members 47 into alignment with the path of the wire laying guide when the shaft 52 makes one revolution at the completion of the formation of each quadrant of field windings. To this end the actuation of the lever 40 is effected by a cam 103 mounted on the forward end of the shaft 52 which coacts with a roller 103ᵃ mounted on the lever intermediate its pivotal end 131 and its inner end which is connected to the bridge member 39. The raising of the lever 40 by the cam member 130 causes an upward movement of the stator support posts 38, resulting in a disengagement of the stator frame cradle gear 41 from the fan gear 42. Upon a downward movement of the lever and stator support, a pawl 132 engages one of the teeth of the gear 36, thus effecting a rotation of the stator frame and cradle. The pawl may be maintained in contact with the gear by a spring member 133 during the downward movement of the support.

The downward movement imparted to the lever 40 by the cam 130 is such that the resulting vertical movement of the stator cradle support will effect a rotation of the cradle support through a distance equaling the angle included between the center lines of three of the slots, thus positioning the slots in alignment with the path of the guide, as will be presently described.

A locking pawl 134 is mounted on the support 37 and travels therewith during the upward and downward vertical movement of the support, thus preventing rotation of the cradle when the latter is being raised.

The pawl is maintained in and out of engagement with the gear teeth by a retarding mechanism comprising a vertically disposed plunger member 135 in slidable engagement with a bearing lug 136 and a friction shoe 137 disposed interiorly of the lug. A spring member 138 presses on the shoe and affords resistance to the upward and downward movement of the plunger 135. Hence the pawl 134 is drawn into engagement and out of engagement with the teeth of gear 41 during the upward and downward movements thereof respectively.

During the period the stator cradle and support are being elevated and lowered, the fan gear 42 is at rest. As hereinbefore stated, the shaft 64 is always stopped in such position that the cam follower 91 is on the high part of the cam 95, thus stopping the fan gear 42 in the same position during the period the cradle is being indexed.

As two of the field poles are wound clockwise while the other two are wound counter-clockwise, it is important that means adapted to reverse the winding action of the arm 18 be associated with the stator rocking mechanism. This is accomplished by changing the position of the fan gear 42 from that in which it was stopped consequent to the stopping of the shaft 64. This change is effected when the stator support is in an elevated position and the gear 41 is out of engagement with the fan gear and is brought about by mechanism actuated upon the movement of the shaft 52, as will now be described.

The repositioning of the fan gear 42 is obtained by changing the angular relation of the oscillating cams relative to the shaft 64 during the period the latter is idle. The change, however, is not effected until the lever 90 has been shifted to its initial position in alignment with the oscillator cam 92. Immediately thereafter a gear 144, which is associated with the oscillator cams, but which does not normally drive the same independently of shaft 64, is shifted forwardly along the shaft by a bifurcated shipper lever 141. The lever 141 has suitable pins acting in a groove 143 formed in the hub of the gear 144 and act upon the gear to move it longitudinally of the shaft into and out of engagement with its companion gear 154, as shown in Figs. 2, 7 and 10.

The spur gear carries rigid pins 144ª in slidable engagement with the oscillating cams and which are of sufficient length to remain in engagement with a collar 140ª when the gear 144 is shifted. The collar is maintained in rigid relation with the cams by screw members 140ᵇ which secure the cams to the sleeve 140. Collars 140ᶜ and 140ᵈ are rigid with the shaft 64 and serve to prevent the sleeve 140 from shifting along the shaft when the gear 144 is shifted out of engagement with the keys 145, Fig. 7.

The actuation of the shipper lever 141 is effected by the rocking movement of a transversely extending rod 146 upon which the lever is rigidly mounted and which is supported by bearing members 147 and 148. A cam lever 150 is positioned on one end of the rod 146 and coacts with a cam 151 mounted on the shaft 52. The cam 151 has a rise 152 which engages the end of the lever 150, and causes the disengaging movement of the shipper lever 141.

The disengaging movement of the gear 143 brings the gear into intermeshing relation with a substantially larger gear 154 mounted on a small stub shaft 155 and supported by bearing bracket 156. The other end of the shaft 155 has a small pinion 157 mounted thereon, as illustrated in Fig. 9, which meshes with a small fan gear 158 pivotally mounted at 159 upon the side of the bracket 156. The fan gear is oscillated by movement of connecting link 160 and lever 161 which are actuated by a cam 162.

The angular relation of the rises and dwells of the cams 152 and cams 162 is such that upon rotation of the shaft 52 the shipper lever 141 disengages the gear 144 and also shifts the gear to intermeshing relation with the gear 154 before the cam member 162 actuates the fan gear 158. The angular movement imparted to the fan gear 158 by the cam 162 and interconnecting lever and link is such that the gear 154, oscillating cams 92, etc., will be rotated substantially 180° on the shaft 64 in which position they again are positively connected to the shaft 64 by keys 145 upon an inward shifting of the gear 143 by the spring member 164. The revolving of the oscillating cams through 180° results in a shifting of the fan gear 42 from an extreme right to an extreme left hand position or vice versa as the case may be. It is to be seen that the initial rocking movement of the stator frame cradle, after the indexing thereof, will be to the right or to the left and the coil being started will be wound clockwise or counter-clockwise according to the relation of the rises and falls respectively of the oscillating cams to the cam follower 91.

The means cooperating with the wire laying arm 18 for positioning the transverse sections compactly against the opposite faces of the stator frame will now be described. Such means may comprise two sets of intermittently operable mechanisms moving in timed relation to the reciprocatory movements of the wire laying arm.

These intermittently operable mechanisms may have fingers 170 and 171, as shown in Figs. 6 and 7, disposed forwardly of the stator frame support 37. A second pair of fingers 172 and 173 are disposed on the opposite side of the stator frame. These fingers are centrally positioned relative to the path of wire laying guide 35 and intermittently cooperate therewith in forming the wire loops comprising the field coils.

The fingers are supported on slide blocks 174 and 175 which are alternately raised and lowered by bell crank levers 178 and 179. The bell crank levers are suitably supported by bearing lugs 180 which are integral with the machine frame member 16. The levers 178 and 179 are actuated by a double face cam member 181 mounted on the outer end of the shaft 64. The contour of the grooves 182 and 183 which are formed in the opposite faces of this cam member are such that the raising of the fingers 170, 171 and the lowering and releasing of the fingers 172 and 173 will be effected by the time the shoe 35 has moved to the dot and dash position, illustrated in Fig. 7.

The fingers are in an open relation, as illustrated in Fig. 6, when approaching the upward position and upon reaching the extreme upward position are closed by mechanism to be presently described. The fingers close over the stretch of wire being laid by the guide 35, and as the stator frame is rocked or oscillated a downward and inward movement of the fingers is effected which causes the strand of wire to be drawn toward the face of the stator frame and beneath the member 47; the fingers remaining in engagement with the loop as the direction of travel of the shoe 35 is reversed and the strand of wire is laid in one of the field frame grooves or slots.

The fingers are disengaged from the wire before the reverse movement of the guide has been completed, and additional tension is placed on the wire by means operable upon movement of the arm, whereby the particular portion of the loop which had been drawn in a downward inward direction by the fingers is drawn tightly into juxtaposition with the loops previously formed or with the face of the stator frame as the case may be.

The wire engaging action just described is repeated by the fingers 172 and 173 upon the reversal of the movement of the arm 18 from an inwardly to an outwardly or forward direction. The mechanisms controlling the operation of both sets of fingers will now be described, referring particularly to Figs. 6 and 7.

An adjustable connecting rod 190 terminating in a ball point 191 is suitably connected to the end of the lever 178. The upper end of the rod 190 is adjustably secured to a hinge member 192 which is connected to the bifurcated end of the finger slide 174. The finger block 174 is disposed between depending support plates 193 and 194. The plates 193 and 194 have slots 195 and 196 formed therein in which the pin members 197 and 198 slide, the latter members being rigid with the finger block 174. The lower portions of the slots 195 and 196 slant toward the stator cradle whereby a downward movement of the finger blocks will result in the fingers being shifted toward the stator frame.

To close the fingers above the wire strand being laid by the shoe 35 a rigid plate 200 is supported on posts 199 is provided which is positioned to interrupt the upward movement of a flanged portion 201 of a slide member 202 which carries pin members 203 and 204 rigid therewith. These pin members extend through the finger block 174 and are also rigid with an inner plate member 205. The plates 202 and 205 and the pins 203 and 201 comprise a unit slidably movable on the finger block 174. The fingers are pivoted on a suitable pin 206 which is rigid with the block 174 but the pins 203 and 204 slide in suitable slots formed therein. The lower extensions of the fingers have diagonally disposed slots 208 nad 209 in which the pin 203 is adapted to slide. Hence when the pin 203 is moved downwardly and away from the finger pivot pin 206, the slots of the respective fingers are moved toward each other and the fingers become closed. This downward movement is effected when the projection 201 of the plate 202 strikes the rigid bridge member 200 upon the extreme upward movement of the finger block 174.

It is desired to move the fingers to the extreme downward position when in engagement with the wire and also to have them remain in engagement with the wire for a definite period while in this extreme downward position during which time the stator will have been rocked in one direction. Means for effecting the opening of the fingers is therefore provided which is operable independent of the downward movement of the finger blocks and comprises lever 210 rigid with the shaft member 185 and having upper extremities offset to engage a roll 212 mounted on an extension of the finger supporting pins 203. The shaft 185 is actuated by a downwardly extending lever member 186 upon which the roller member 187 is mounted and is acted upon by a double rise cam 188. It will be noted that the cam 188 effects an opening movement of the fingers twice for each revolution of the shaft 64. But one of the opening actions is effective however since the shoe 35 is on the opposite side of the field frame during alternate upward movements of the fingers. Premature closing or opening of the fingers is prevented by a grooved leaf spring 206 which bears upon the lower raised portions 202ª of the plate 202.

The means for adjusting the position of guide 35, and the mechanism for intermittently exerting tension on the wire as it is being laid in the stator slots by the guide will now be described. Referring particularly to Fig. 8, the arm 18 is shown as formed somewhat like a small boom, and is pivotally supported on the rod 19 between upwardly extending ears 220 which are integrally formed on the slide member. An adjusting post 221 is disposed beneath a rib 222 of the arm 18 and a nut 221ª serves as a shoulder upon which the rib or bridge 222 rests. A stud member 224 having a knurled head 223 extends through the bridge 222 and has a shoulder engaging the upper side thereof while the lower end of the stud is threaded into the slide 20. The desired adjustment is made by raising or lowering the member 221ª, after which the stud 224 may again be brought into clamping position upon the arm 18.

To exert an intermittent tension upon the wire, I have shown a yielding friction member secured to a bridge across the arm, indicated at 226. A stationary cam 230 positioned on the flange 22 of the top frame member 17 may act to raise a lever 228 and friction member 22 into coaction with its companion 225 to press the wire between them. The cam 230 is adjustable longitudinally of the arm 18, whereby the timing of the tension period may be adjusted relative to the movement of the arm 18 and fingers 170 to 173 inclusive.

The period during which the maximum tension on the wire W is desired, is after the fingers have drawn the partially completed transverse portion of the loop to extreme downward position adjacent the face of the stator frame and at which time the guide 35 will be laying the wire in one of the stator slots.

It will be noted that the means for actuating the winding mechanisms as well as the means for automatically conditioning those elements to bring about a reverse winding action are intimately associated with various mechanisms for automatically resetting the winding and coil counting mechanism. These groups of mechanisms however are driven independently of each other by shafts 64 and 52 respectively.

Hand wheels 240 and 241 are therefore positioned on the forward ends of the shafts 64 and 52, whereby the various mechanisms may be independently adjusted when the respective shafts are not connected to the driving means.

The means for starting and stopping the various mechanisms which are active in effecting the formation of the field coils and for starting and stopping the mechanical means which reset said mechanisms to form a new field quadrant will now be described.

The stopping of the shaft 64 which stops the winding operation and the starting of the shaft 52 to begin the reconditioning of the winding elements are each determined by the operation of electric solenoids (Figs. 1 and 8) 103 and 104 respectively. The flow of electric energy to the solenoids 103 and 104 is controlled by the switch mechanism, illustrated in Fig. 17 alternately operated by rotation of the cam sleeve 76 and a disc member 255 mounted on the shaft 52 as will be presently described.

A plunger-like armature 103ª of the solenoid 103 is connected to a link 107 which operates a shipper lever 108, the shipper lever 108 being pivotally mounted on a pin 109 carried on bracket 110. The upper end of the shipper lever is bifurcated to span and engage trunnions of a collar 111 which embraces the shaft 60 and has shoulders engaging a fixed collar and the hub of the gear 62 to cause shifting of the shaft. The solenoid 103 is energized during the winding period, to actuate the lever 108 to maintain the friction disc 59 in driving contact with the friction pinion 56 by exerting longitudinal pressure on the shaft through the collar 111.

After the counting cams and associated elements have rotated through the cycle of operations, which effect the completion of one quadrant of windings, the switch mechanism controlling the energy to the solenoid 103 is actuated and a spring member 112 shifts the driving shaft 60, thus causing the friction disc to move out of contact with the friction pinion 56 and into contact with a brake member 114 rigidly mounted on the bed 14 of the machine. Hence the reciprocatory movement of the winding arm 18 is immediately arrested upon the de-energizing of the solenoid 103. The spring 112 may be disposed on the inner end of the shaft in abutting relation to a collar 113 rigid with the shaft and the face of the bearing member 61.

The switch mechanism as illustrated in Fig. 17 comprises a rocker lever 256 mounted on a pivot pin 257 carried by a bracket member 258 secured to the frame of the machine. The rocker lever 256 has outwardly extending disposed arms substantially parallel with the cam shaft 72. One arm may be acted upon by a pin 259 rigidly mounted on a disc member 255, positioned on the shaft 52, while the other arm may be so disposed as to be acted upon by the stop member 119. A downwardly extending wedge-shaped portion 256ª is formed centrally of the two arms and is arranged to be acted upon by a V-shaped plunger member 260 which is maintained in engagement therewith by a spring member 261 mounted in a suitable bore formed in the bracket member 258. Stop pins 262 serve to limit the movement of the lever 256 while permitting a sufficient swinging of the ends of the arms to clear the path of the moving actuating members 119 and 259.

One of the arms of the lever 256 is connected to a rocking switch blade 263 by a member 264, the blade being mounted on the bracket 258. The switch and its terminals are shown as suitably insulated from the adjacent metal parts. To this end, the pivotal mounting of the switch blade 263 consists of bearing members formed of fibre or other suitable insulating material as shown in Fig. 18. The pivot 265 is shown connected at one end to an electric wire 266 serving as a conductor to the switch blade 263. Contacts 267, mounted on a fibre block 268, are connected to a wire 269 leading to the solenoid 104. A second switch contact 270 is connected to a wire 271 leading to the solenoid 103.

It will be seen that as the cam shaft 72 rotates, the stop member 119 will eventually act upon one of the arms of the lever 256 and impart a gradual downward movement thereto, resulting in the wedge portion 256 depressing the plunger member 260, and incidentally compressing the spring member 26 until the center points of the respective members have been shifted past each other, after which the plunger 260 will quickly act under the force of the spring 261 in an upward direction, thus causing a quick shifting of the lever arm 256 through the remaining portion of its movement.

The rod 264 is connected to the lever 256 by a suitable pin member which travels in an arcuate slot 256ᵇ during the period the lever is being gradually shifted by the downward movement of the member 119. The length of the slot may be such however, that the lever will act upon the connecting rod at the instant the plunger suddenly shifts the lever; thus resulting in a rapid disconnecting of the switch blade 263 with the contacts 270 and an instantaneous contacting or connecting of that member with the contacts 267. The result of this switch action is that the solenoid controlling the means which couples the shaft 64 to the driving means is disconnected and the reciprocating arm is immediately brought to rest, while the energization of the solenoid 104 brings about the coupling of the shaft 52 to the driving means and the disc member 255 then carries the pin 259 in a circular path in which the end of the raised arm of the rocker lever 256 is disposed, resulting in a reverse movement of the lever and a quick making and breaking of the switch contacts in the manner as hereinbefore described.

Referring to Fig. 6, it will be noted that the first movement of the guide 35 lays a strand of wire in slot A. In other words, the initial rocking movement of the stator is from the left to the right and the final wire laying movement of the guide 35 is consummated when the slot B is in alignment with its path, the first group or quadrant of coils being completed at this time and the rocking movement of the stator cradle and the reciprocating movement of the arm being stopped with the slot B in said position.

The raising and lowering of the stator cradle, as herein set forth, causes the pawl 132 to engage the gear on the stator support and index the stator through 30° or three slots upon the downward movement of the support, thus bringing the slot C in alignment with the path of the wire laying guide. As the oscillating cams have been shifted through 180° in the meantime an oscillatory movement of the stator will take place before a reciprocatory movement of the wire laying guide, thus bringing the slot D in alignment with the path of the guide before the initial movement thereof when starting to wind the second group or quadrant of field coils.

When the second quadrant of the coils have been completed, however, the final movement of the wire laying guide will be also consummated when the slot B is in alignment with its path, thus necessitating an indexing movement of the stator through an angle covering the span of the included slots from B to F, it being necessary to position the slot F in alignment with the path of the wire guide when starting to wind the third quadrant of coils in a clockwise direction.

Since the action of the pawl 132 effects only a 30 degree indexing movement of the stator, it is important that means be provided whereby one more rocking movement of the fan gear 42 takes place from the left to the right to bring the slot E into alignment with the wire guide path before the shaft 64 is stopped when completing the formation of the second and fourth quadrants. In Figs. 20 and 21, I have shown a switch mechanism responsive to the rocking movement of the fan gear 42 which is closed by its movement and remains closed when the fan gear is in an extreme left position during the major rocking movements thereof, namely, when the largest coil of each quadrant is being formed.

The switch mechanism comprises a link 300 pivotally connected to a suitable projecting lug formed on one of the lever members 95ᵃ, as indicated at 301. This link member extends downwardly through an opening in the frame member 17 of the machine and acts upon a switch arm 302 suitably mounted on an insulated bearing block 303 secured to the underside of the frame member 17. The switch arm may have a suitably insulated pin member 304 positioned to ride in a slot 300ᵃ of the link member 300. When the lever 95ᵃ and the fan gear 42 are rocked to an extreme position to the left, the link member 300 engages the pin 304, thus raising the switch arm 302.

One of the switch arms is wedge-shaped, as indicated at 304, to engage a spring plunger 305 mounted in the block 303. A spring member 306 causes the plunger 305 to move outwardly and cause a quick closing movement of the switch blade 308 and contact 309 is brought into engagement with a terminal 310 mounted on the under side of the frame member 14. This quick closing movement takes place when the switch arm 302 has been raised slightly above a horizontal position by the link member 300. A lead wire 311 coming from the line is thus connected to a solenoid wire 312, the current passing through the block member 303, switch arm 302, blade 308, etc.

When the switch is closed the solenoid 103 which controls the movement of the shaft 64 is energized independently of the stopping switch 270, Fig. 17, as hereinbefore described, hence there is a prolonged movement of the shaft 64 through an additional quarter revolution, thus effecting a final additional movement of the fan gear from the extreme left to the extreme right before the switch 310 is again opened and the solenoid 103 de-energized. The slot E is thus brought into registration with the path of the wire laying guide 35 at the completion of the second quadrant of field coils and the raising and lowering of the stator frame results in the stator being indexed an additional 30° in a counter-clockwise direction, thus bringing the slot F in alignment with the path of the wire guide when the formation of the third group of the stator coils is started.

The switch mechanism, shown in Figs. 21 and 22, is not effective at the completion of the first and third quadrant of coils as the final rocking movement of the fan gear 42 is in a position to the extreme right with the result that the switch mechanism is open at the same time the switch 270 is open, thus de-energizing the solenoid.

I have provided additional switch controlling means for arresting the entire operation of the machine when the stator has been completely wound which comprises a pinion 325 mounted on the shaft 52 and a gear 326 suitably mounted on one of the brackets 53 which may be four times the diameter of the pinion, whence four revolutions of the shaft 52 will rotate the gear 326 once.

Suitable concentric contact rings 350 and 351 may be secured to the face of the large gear and stationary brushes 352 and 353 secured to the frame member 14 but insulated therefrom may respectively contact therewith. The rings may be shorted by a connecting strip 360 and may extend around the shaft in the form of incomplete circles, there being a sufficient break in the rings whereby the brushes will lose contact therewith and open a circuit controlling the current to the motor at the completion of every fourth revolution of the camshaft 52. A fiber block 354 insulates the free ends of the brushes from the gear 326 when they are out of contact with the rings.

The operation of the machine is as follows: A winding stator S is located in the cradle 41 by aligning the groove T formed in the stator laminations with the key T'. The first pair of hook members 47 may then be properly positioned by placing them on the stator frame in radial alignment with the key T'. The other hooks may then be positioned on the stator 90° apart. The stator may then be rocked by turning the hand wheel 240, thus causing the oscillating cam 92 to move the fan gear 42 until one of the stator slots adjacent the hooks 47 is in alignment with the reciprocatory path of the shoe 35. Wire may then be threaded from the spool through the tension members 225 and 226 and through the passage 35ᵃ of the guide 35 and may then be temporarily twisted about one of the hooks 47. A further turning of the shaft 64 by manipulation of the hand wheel 240 will cause the guide 35 to start a traversing movement along the aligned stator slot.

The solenoid 103 may then be energized by closing a line switch (not shown) thereby causing a longitudinal shifting of the shaft 60 and the driving engagement of the friction member 59 with the drive pinion 56. Since the cams which operate the gripping fingers are positioned on the shaft 64 which acts primarily to drive the arm 18 through the vertical shaft 67, synchronism of the finger movements with the reciprocatory movements of the arm as well as the rocking movements of the stator is obtained without necessitating diligence on the part of the operator in adjusting or positioning any of the active elements of the machine.

After the wire guide 35 has completely traversed the initially aligned slot, a rocking motion is imparted to the stator by the oscillation of the fan gear 42 during which oscillating movement the arm 18 will be at rest. The duration of the dwell of the arm 18 is equal to the amount of time the slide frame member 25 is acting upon the roller 33 when the roller is traversing the parallel portion 31 or 32 of the slot 30. The active period of the fingers, when they are drawing the wire loop downwardly, during the oscillating movement of the stator is of a considerably shorter period, than this rest period of the guide.

When the cradle and the field frame are rocked to bring the slot on the other side of the pair of hooks into alignment therewith and the arm has partially completed its return movement, tension on the wire is caused by the contracting action of the members 225 and 226. The disengagement of the fingers from the partially formed loop is effected by the upward movement of the levers 210 slightly in advance of the action of the tension members 225 and 226 upon the wire. When the shoe reaches its innermost position it dwells, and the inner fingers are elevated to engage the wire at the instant the return oscillation is imparted to the stator frame.

The foregoing described cycle of operations is repeated as hereinbefore stated 13 times in the formation of the first set of coil loops and the accurate determination of the number of loops being formed is brought about through the movement of the cams 77, etc., past the end of the shifting bar 98. The face of each of the respective cams is of such length that contact will be maintained with the end of the shifting bar for a period sufficient only to permit the required number of oscillations of the cradle, and the reciprocatory movements of the arm to form the desired predetermined number of coils. The bar 98 thereupon loses contact with one cam and drops into contact with the next cam at the instant the winding arm has effected the formation of a complete predetermined number of loops. This shifting action takes place when the follower 91 is in contact with that portion of the face of the oscillating cam member 92 which is in longitudinal alignment with portions of cams 93, 94 and 95; and the cam lever 90 is shifted in a longitudinal direction resulting in the roller 91 coming into engagement with the cam 93. The movement of the shifting bar toward the cams is effected in a comparatively short period of time by reason of the action of the spring member 101 hence the continued rotation of shaft 64 does not cause the cams to interfere with the movement of the cam follower.

The rise and fall of the cam 93 is made sufficiently greater than that of the cam 92 to cause the fan gear 42 to oscillate through a greater angle and to rock the stator frame through a correspondingly greater angle, whence the stator slots adjacent to those previously wound will be alternatingly brought into alignment with the path of the wire laying guide 35. A second set of coils as heretofore stated, may comprise 26 complete loops and after the completion thereof the lever shifting operations increasing the oscillation of the fan gear 42 will be repeated. After the third set of coils, comprising 26 in number is formed, a further shifting of the cam lever 90 conditions the machine for effecting the winding of the last set of loops of the field quadrant which comprises a coil of 13 turns.

At the consummation of the formation of the four sets of coils contained in the field quadrant, the counting cam shafts 72 will have been rotated through its active period; the switch 270 will have been opened by the action of member 119; and the switch 267 closed, thus causing the energization of the solenoid 104, connecting the shaft 52 to the rear driving shaft 57, by the clutch 115 as hereinbefore described. The brake member 116 thereupon immediately acts to arrest the movement of the driving mechanism which operates the gripping fingers, the wire laying arm and the stator oscillating mechanism.

During the period the shaft 64, and consequently the winding mechanism, is at rest, the shaft 52 makes one complete revolution and the counting cams 77 and 77$^a$, etc., are reset to the initial position by the action of the shift lever 86, the shipper lever 81 and friction disc 118 which rotates the group of counting cams in a reverse direction until the finger 119 moving therewith strikes the end of the shift bar 98, thus stopping these cams in a starting position. The action of shifting the end of the collar 79 into driven engagement with the friction disc 118 also brings about the disengagement of the cam driving action of the worm wheel 71 as the lugs 75 are drawn out of engagement with the teeth of the bevel gear 74, permitting this resetting of the counting cams.

The operation of resetting the counting cams 77, etc., to initial position is preceded by the action of the drum cam 120 in repositioning the bar 98, and consequently the lever 90 to its initial position whereby the cam roller will be shifted into contact with the first oscillating cam 92 which causes the shortest rocking movement of the field frame. The end of the bar which cooperates with the counting cams will therefore be shifted away from the cams before the resetting thereof, and is ready to engage the largest cam 77 and begin its successive inward movement in engaging the several counting cams, (see Fig. 11.)

The reversing of the winding action of the arm 18, whereby the sets of coils in the second field quadrant will be wound counter to the direction in which the prior group of coils has been found, as has been stated, is brought about by changing the initial rocking movement of the stator either to the right or to the left. As heretofore explained, this is effected by controlling the position of the fan gear 42 with relation to the cradle gear 41, whereby the first movement of the gear upon the starting of the shaft 64 will rock the gear either to the right or to the left. Hence the rotation of the shaft 52 results in the cam 162 (Fig. 9) imparting a rocking movement to the fan gear 158 and consequently the movement of the gear 143 through 180°, thus causing a resetting of the fan gear 42. This action, however, is subsequent to the disengaging of the gear 100 from the shaft 64 by the cam 151 which is also rotated by the shaft 52.

As previousely explained, the movement of the oscillator cams 77, etc., is arrested after each quadrant of coils is completed but in alternate positions 90° apart relative to the cam follower 91, due to the prolonging of the rotation of shaft 64 at the completion of each alternate quadrant of coils. Hence the resetting of the cams through 180° accomplishes the proper positioning of the fan gear to effect the rocking of the stator in the desired direction and also times the dwells in the rocking and reciprocating movements of the stator cradle and wire guide respectively, whereby the reciprocatory movement of the wire guide will precede a rocking movement of the stator at the starting of the first and third quadrant of coils.

During the period the resetting of the oscillator cams takes place, the stator cradle and support are being raised and lowered by the cam 130 and lever 40. Upon the downward movement of the support the indexing pawl 132 engages one of the teeth of the gear 41, causing an angular movement of the cradle as the support and cradle are lowered as hereinbefore set forth.

The stopping of the shaft 52 is effected through the action of pin 259, Fig. 17, on the switch arm 256 and the resulting opening of the switch 267. The solenoid 104 will thus be de-energized and release the clutch member 115. During the final movement of the disc 255, the switch 270 controlling the other solenoid 103 is closed and remains closed as long as the disc 255 is at rest or until the circuit is again closed through switch 267 by the rotational movement of the counting shaft 72.

From the foregoing description of my invention, it is apparent that I have brought about the efficient co-ordination of a group of mechanical elements whereby heretofore complicated and laborious operations in the manufacture of electric motor stators is accomplished in a consistently uniform and economic manner. The production of the machine is limited only by the character of the insulation covering the wire and with the grade of insulation commercially obtainable, I am able to effect the complete winding of the stator in an unusually short period of time. The arrangement of the various mechanical parts is such that the machine may be readily adapted to effect the winding of motor stators having diagrammatic characteristics which are radically different from the motor field described. Moreover, it is to be understood that the principles herein set forth for effecting the winding of the field coils of dynamo-electric machines automatically, may be embodied in a variety of designs depending upon the nature of the particular field structure to be formed and the expedients resorted to by the designer in embodying those principles in an automatic machine.

In any case, the arrangement of the mechanisms may be such that an ordinary electric testing annunciator system may be installed on the machine to immediately arrest the winding operations thereof in case a short or break should occur in the field coils when being wound. Furthermore, the machine, as herein described, is arranged to wind a complete motor field in final production form directly upon the stator frame without necessitating any attention on the part of the operator after the initial position of the stator in the machine.

Having thus described my invention, I claim:

1. In a winding machine of the character described, the combination of a rocking frame adapted to support a motor stator, means for rocking said stator and frame equidistantly past a definite line, a wire laying guide following a path along said line, a mechanism actuated upon a predetermined number of movements of the guide for stopping its movement, means for indexing said stator when said wire guide is stationary, and a mechanism for causing said stator indexing means to act on the stator upon the completion of a predetermined number of rocking movements thereof, said indexing mechanism and said stopping mechanism being adapted to be coupled to a power means by independently operable solenoid actuated means.

2. In a winding machine of the character described, the combination of a rotatable frame adapted to support a motor stator, means for alternately imparting a partial rotation to said stator and frame in opposite directions, a wire laying guide following a path substantially parallel to the axis of rotation of said frame, means for stopping the movement of said wire guide upon the completion of a predetermined number of reversing movements of said stator, means for simultaneously actuating said stator and guide operating means, and other actuating means operable independently of said stator rotating means but in timed relation therewith for indexing said stator when said wire guide is stationary.

3. In a stator winding machine of the character described, the combination of a rotatable work holder adapted to support a motor stator, a wire laying guide adapted to lay wire along the opposite faces of said motor stator frame during reciprocatory movements of the frame, means for imparting reciprocal and rotational movements to said stator, whereby the path of said wire laying guide will be along parallel lines displaced a distance equal to the reciprocatory movement of the stator support, cycle counting mechanism positively geared to the movement imparting means, and arranged to act on the said means to increase a reciprocatory movement when a predetermined number of reciprocations have been effected.

4. In a stator winding machine of the character described, the combination of an oscillatory work holder adapted to support a motor stator, a wire guide adapted to lay wire transversely of said motor stator by a reciprocatory movement, means for oscillating said stator, whereby the wire guide will lay the wire along parallel paths longitudinally of the stator and the distance between said parallel paths at a predetermined number of passes of said wire laying guide, and means for elevating the stator holder to disengage it from the oscillating means.

5. In a stator winding machine, the combination of means for supporting a motor stator frame, a wire laying guide adapted to reciprocate in and out of the stator frame, means for imparting a rocking movement to the stator frame, and automatic means for successively increasing said rocking movements of the stator frame at the termination of a predetermined number of reciprocations of said wire guide, said means including a plurality of step-up cams and a connecting lever between the cams and stator supporting means.

6. In a stator winding machine, the combination of means for supporting a motor stator frame, a wire laying guide adapted to reciprocate in and out of the stator frame, means for imparting a rocking movement to the stator frame, a common means for driving the stator and guide actuating means, means actuated by said driving means for successively increasing said rocking movement of the stator frame upon a predetermined number of reciprocations of said wire laying guide, and other driving means actuated in timed relation to the stop periods of the guide and stator driving means for indexing the stator frame through substantially 30° after a predetermined number of increases in the rocking movement of said stator frame.

7. In a stator winding machine, the combination of a rocking work holder, a wire guide adapted to lead a continuous strand of wire in and out of a stator frame, means for imparting alternate rocking and reciprocatory movements to the respective members whereby wire is formed into superposed loops, mechanism for increasing the rocking movement of the work holder upon the completion of a predetermined number of loops, and a mechanism driven in timed relation with the stator frame and guide for resetting the stator operating mechanism to an initially operative condition.

8. In a stator winding machine, the combination of means including a movable frame for supporting a stator, and a gear on the frame for rocking the stator across a fixed path, wire laying means adapted to reciprocate in said path and cooperate with the moving stator in forming field coils thereon, means for imparting an increased rocking movement to the stator in successive order at the termination of predetermined numbers of reciprocations of said wire laying means, and means acting on the stator rocking means for varying the number of coils formed by said wire laying means upon the stator during each of said successive periods.

9. In a stator winding machine, the combination of a stator supporting means, a gear connected with said means for rocking the stator across a fixed path, wire laying means adapted to reciprocate in said path and lay wire longitudinally of the stator, means acting on the stator rocking means for successively increasing the rocking movement of said stator at the termination of a predetermined number of reciprocations of said wire laying means, and means for determining the number of coils formed by said wire laying means upon the stator during the successive periods of increased movements imparted to the stator.

10. In a stator winding machine, the combination of means for rocking a stator past a fixed path, including a support for the stator and means having a dental connection with the stator support, wire laying means adapted to form superposed field coils upon said stator during said rocking movement, means for imparting a relative reciprocatory movement between said wire laying means and said stator, means acting on the stator rocking means for increasing the angular movement of said stator at the termination of the formation of a definite number of coils upon the stator by said wire laying means, and means for resetting the stator actuating means whereby it will effect initial angular movement at the termination of a series of successive increases in the angular movement of the stator.

11. In a stator winding machine, the combination of means for rocking a stator past a fixed path, wire laying means having an alternate movement relative to the movement of the stator and adapted to form superposed coils thereon, means for rocking the stator including a series of mechanically driven rotating elements, and a member having a connection with the stator rocking means arranged to co-operate successively with said elements for increasing the movement of said stator at the termination of the formation of a definite number of field coils upon the stator by said wire laying means, means for resetting the stator actuating means whereby it effects an initial angular movement of the stator at the termination of a series of successive increases in its angular movement, and means for indexing the stator.

12. In a stator winding machine, the combination of a work holder, a reciprocatory wire laying member moving toward and from the same, means including a series of successively operating rotating elements driven as a unit for imparting a reciprocatory movement to said work holder, means for controlling the last named means whereby the operation thereof is arrested upon the completion of each set of loops and the angular reciprocatory movement of said work holder may be increased at completion of successive sets of field coils, and cycle counting means for controlling the number of loops formed in each set of coils.

13. In a stator winding machine, the combination of a work holder, a reciprocatory wire laying member moving toward and from the same, a gear carried by the work holder and a gear co-operating therewith, for imparting a reciprocatory movement to said work holder, positively driven means in geared relation with the wire laying member, means for controlling the said co-operating gear whereby the angular reciprocatory movement of said work holder may be increased after predetermined numbers of reciprocations of the wire laying member, and means responsive to the movement of said controlling means for arresting the movement of said stator and said wire laying member upon a predetermined number of co-operating movements thereof.

14. In a stator winding machine of the character described, the combination of a rocking frame adapted to support a motor stator, means for rocking the stator, a wire laying arm passing in and out of said stator intermittently, means for increasing the angular movement of the stator step by step, said means including successively active counting members in geared relation to the stator rocking means for determining the number of reciprocations of said wire laying arm between the successive step increases of the angular movement of the stator frame, and means for arresting and starting the movements of the stator and arm including means for readjusting the stator operating means to an initial starting position, whereby a minimum rocking movement will be imparted thereby to the stator upon the restarting of the movement thereof.

15. In a winding machine of the character described, the combination of a rocking frame adapted to support a motor stator, a wire laying arm adapted to reciprocate into and out of said stator, a plurality of rotating operating members and a connection between said members and the frame arranged to coact with the members successively for increasing the rocking movement of said stator at the termination of a predetermined number of reciprocations of said wire laying arm, means for controlling the movement of said stator support and said arm, whereby a relative intermittent reciprocatory movement is obtained between them, means for arresting said reciprocatory movements at the completion of a predetermined number of rocking movements of said stator support, and means controlling the frame rocking means for reversing said relative movements, whereby a group of field coils may be wound clockwise, and a succeeding group wound counter-clockwise.

16. In a stator winding machine, the combination of means for rocking a stator past a fixed path, a wire laying guide, means for imparting a reciprocatory movement to said guide, and means for stopping said wire laying guide at a definite position in said path subsequent to a predetermined number of reciprocations of the guide in the path, and means for causing an increase in the rocking motion of the stator while the latter is being actuated by said first named means.

17. In a stator winding machine, the combination of means for supporting and rocking a stator about its axis, a wire guide, means for moving said wire guide in a path parallel to said axis, means for arresting the movements of said stator supporting means and said guide in predetermined positions, and means actuated subsequent to a definite number of movements of the wire guide for imparting a definite vertical and angular movement to the stator support when said guide is in said arrested position.

18. In a stator winding machine, the combination of means for oscillating a stator past a fixed path, said means including a stator supporting frame, a gear on the frame and a second gear co-operating therewith, a wire laying guide moving in said path, means for imparting a reciprocatory movement to said guide, means acting on the stator rocking means for increasing the oscillatory movement of the stator in successive stages, each increase being effected at the termination of a predetermined number of oscillatory movements of the wire laying guide, and means for stopping said wire laying guide and said stator at definite relative positions subsequent to a predetermined number of reciprocations of the guide in said path.

19. In a stator winding machine, the combination of means for supporting and rocking a stator about its axis, a wire guide, means for moving said wire guide in a path parallel to said axis, means for arresting the movements of said stator supporting means and said guide in predetermined positions, and means positively driven by the stator rocking means for reversing the relative movements of the guide and stator supporting means, and a cycle counting mechanism controlling said last named means.

20. In a winding machine of the character described, the combination of a rotatable frame adapted to support a stator, means for imparting a partial rotation to said stator and frame in opposite directions, a wire laying guide adapted to traverse slots formed in the stator between intermittent partial rotational movements of the stator, means for driving said wire laying guide, and means positively driven by said last named means for controlling the stopping of the wire laying guide in a definite position relative to the stator subsequent to a predetermined number of oscillations of the stator.

21. In a winding machine of the character described, the combination of a rotatable frame adapted to support a motor frame, means for imparting a partial rotation to said stator and frame in opposite directions, a wire laying guide adapted to traverse slots formed in the stator between intermittent partial rotations of the stator, means for driving said wire laying guide including transversely and longitudinally movable slide members, one of said members acting upon the other in effecting dwells at the end of each traversing movement of the wire laying guide.

22. In a stator winding machine of the character described, the combination of an oscillatory member adapted to support a stator, a wire laying guide arranged to traverse said stator in reciprocatory movements, and means for increasing the oscillatory movement of the stator supporting member, including a series of step cams, lever and gearing mechanism acting successively on the cams and connected to the stator supporting member for imparting said increased oscillatory movement to the stator, and means for progressively shifting the lever mechanism from one cam to another at predetermined periods during which periods said wire laying arm will traverse adjacent slots of the stator successively.

23. In a stator winding machine of the character described, the combination of a stator supporting member, gear means for oscillating said member, a wire laying arm, means for imparting a reciprocatory movement to the arm, whereby it may traverse the stator during intermittent dwelling periods in the oscillatory movement of the stator, and means for driving said stator oscillating means and said wire laying arm, including a friction drive and means operable upon the completion of a predetermined number of co-operating movements of said oscillating stator and said wire laying arm for disengaging the friction drive.

24. In a stator winding machine of the character described, the combination of an oscillating member adapted to support a stator, means for imparting oscillatory movement thereto, means for guiding a continuous strand of wire transversely of the stator, whereby the stands will be laid in interstices formed in the stator, including a reciprocatory member carrying a wire laying shoe arranged to traverse said slots, and wire gripping mechanisms disposed on the opposite side of the stator support arranged to alternately engage said continuous strand of wire and draw it downwardly when said stator is being oscillated and means for tensioning the wire as it is being drawn through the slots.

25. In a stator winding machine of the character described, the combination of a stator supporting member, means for oscillating said stator supporting member, a wire laying arm, means for imparting a reciprocatory movement to the arm, whereby it may traverse the stator during intermittent periods of the oscillatory movement of the stator, means for driving said stator oscillating means and said wire laying arm, means for arresting the movements of the respective members upon the completion of the formation of one pole winding by the wire laying arm and other means for indexing the stator and initiating the operation of the arm to start a new pole winding.

26. In a stator winding machine of the character described, the combination of an oscillating member adapted to support a oscillating stator, means for imparting oscillatory movement thereto, means for guiding a continuous strand of wire transversely of the stator, whereby the strands will be laid in stator, whereby the strands will be laid in interstices formed in the stator, including a reciprocatory member carrying a wire laying shoe arranged to traverse said slots, means for effecting a tension in the wire when being laid in said slots, and wire gripping mechanism disposed on the opposite side of the stator support arranged to alternately engage said continuous strand of wire and draw it downwardly when said tensioning means is inoperative.

27. In a stator winding machine, the combination of means for rocking a stator past a fixed path, a wire laying guide reciprocating in said path and arranged to lay a continuous strand of wire in the slots formed in said stator during dwelling periods at the end of each rocking movement of said stator, and means for exerting tension on the wire strand only during that part of the movement of the arm when the wire is being laid in the slots by said wire guide.

28. In a stator winding machine of the character described, the combination of a rotatable work holder adapted to support a motor stator, means for imparting an oscillatory movement to said holder, wire laying means adapted to reciprocate transversely of the stator, including a shoe adapted to traverse the slots formed in the stator, means for exerting tension in the wire during said wire laying movement of the shoe, and means for releasing said wire tensioning means when the stator is being oscillated.

29. In a stator winding machine, the combination of means for supporting a motor stator frame, wire laying means arranged to have a reciprocatory movement into and out of the frame, means for rocking the stator frame through increasing angles in timed relation to the reciprocations of the wire laying means whereby coils of wire are wound in a given direction, said stator rocking means including a pair of co-operating gears, means for disconnecting the gears, rotating one of the gears independently of the other, and then restoring the gears to co-operation to change the relation of the stator frame to the wire laying means for reversing the direction of winding the coils.

30. In a stator winding machine, the combination of means for rocking a stator past a fixed path, a wire laying guide reciprocating in said path and arranged to lay a continuous strand of wire in the slots formed in said stator during dwelling periods at the end of each rocking movement of said stator, an adjustable arm carrying said guide, and means for exerting tension on the wire strand as it is being laid in such slots by said wire guide, said means including contracting members carried by the arm, and means operable upon movement of the arm for controlling said members.

31. In a stator winding machine of the character described, the combination of a rotatable work holder adapted to support a motor stator, means for imparting an oscillatory movement to said holder, wire laying means adapted to reciprocate transversely of the stator, including a shoe adapted to traverse the slots formed in the stator and guide the wire therein, means for exerting tension in the wire during said wire laying movement of the shoe, means for imparting an oscillatory movement to the stator, and alternately operable wire gripping members disposed on each side of the stator adapted to draw the wire toward the stator faces during said oscillatory movement and release the wire when said wire tensioning means acts upon the wire.

32. In combination a motor stator supporting means, a wire laying member, means for effecting a relative oscillatory-reciprocatory movement between said member and supporting means, driving means therefor, a cycle counting mechanism controlling said movement and actuated by the driving means, and means interposed between the counting mechanism and the driving means for causing the latter to reset the counting mechanism to an initial starting position.

33. In combination, a motor stator supporting means, a wire laying member, means for effecting a relative oscillatory movement between the stator supporting means and the wire laying member, driving means therefor, a cycle counting mechanism and mechanism interposed between the cycle counting mechanism and the oscillating means for effecting an increase in said relative oscillatory movement.

34. In combination, a motor stator supporting means, a wire laying member, means for effecting a relative oscillatory movement therebetween, a cycle counting mechanism, a driving means for the counting mechanism, a wire laying member and stator supporting means, a mechanism controlled by the counting mechanism for increasing said oscillatory movement successively upon the completion of predetermined members of said movements and a separate mechanism actuated by said driving means for resetting the counting mechanism to an initial starting position and for indexing the stator supporting means.

35. In combination, a wire laying member, a stator supporting member, means for effecting a relative oscillatory movement therebetween, actuating means for said first named means, a cycle counting mechanism driven thereby and means controlled by the cycle counting mechanism for increasing said oscillatory movement during the period said members are being actuated.

36. In combination a motor stator supporting means, a wire laying member, means for effecting a relative oscillatory reciprocatory movement between said member and supporting means, driving means therefor, a cycle counting mechanism actuated by the driving means, means interposed between the counting mechanism and the driving means for causing the latter to reset the counting mechanism to an initial starting position and means for indexing the stator when the counting mechanism is being reset.

37. In combination, a motor stator supporting means, a wire laying member, means for effecting a relative oscillatory movement between the stator supporting means and the wire laying member, driving means therefor, a cycle counting mechanism, a mechanism interposed between the cycle counting mechanism and the oscillating means for effecting an increase in said relative oscillatory movement, means for indexing the stator, a separate driving means therefor and means for automatically disconnecting the cycle counting mechanism from one driving means and connecting it to the other driving means and thereby reset the counting mechanism.

38. In combination, a motor stator supporting means, a wire laying member, means for effecting a relative oscillatory movement therebetween, a cycle counting mechanism, a driving means for the counting mechanism, wire laying member and stator supporting means, a mechanism controlled by the counting mechanism for increasing said oscillatory movement successfully upon the completion of predetermined members of said movements, means for automatically altering said relative oscillatory movement of the wire laying member and stator supporting means whereby a coil may be wound in a reverse direction and a separate mechanism actuated by said driving means for resetting the counting mechanism to an initial starting position.

39. In combination, a wire laying member, a stator supporting member, means for effecting a relative oscillatory movement therebetween, actuating means for said first named means, a cycle counting mechanism driven thereby, means controlled by the cycle counting mechanism for increasing said oscillatory movement during the period said members are being actuated and means for altering the oscillatory relationship of said members automatically whereby groups of coils may be wound clockwise and counterclockwise.

40. In combination a motor stator supporting means, a wire laying member, means for effecting a relative oscillatory reciprocatory movement between said member and supporting means, driving means therefor, mechanism for automatically reversing said relative movements, a cycle counting mechanism actuated by the driving means, means interposed between the counting mechanism and the driving means for causing the latter to reset the counting mechanism to an initial starting position and drive said reversing mechanism.

41. In combination, a motor stator supporting means, a wire laying member, means for effecting a relative oscillatory movement between the stator supporting means and the wire laying member, driving means therefor, a mechanism automatically effecting a reversal of said relative movement whereby a coil may be wound in a counterdirection, a cycle counting mechanism, mechanism interposed between the cycle counting mechanism and the oscillating means for effecting an increase in said relative oscillatory movement, means for indexing the stator through one angular pole space and means operable independently of the counting mechanism for prolonging the oscillatory movement through one half a cycle whereby the resultant angular movement of the indexing mechanism will be the equivalent of two pole spaces.

42. In combination, a motor stator supporting means, a wire laying member, means for effecting a relative oscillatory movement therebetween, a cycle counting mechanism, a driving means for the counting mechanism, wire laying member and stator supporting means, a mechanism controlled by the counting mechanism for increasing said oscillatory movement successfully upon the completion of predetermined members of said movements, a separate mechanism actuated by said driving means for resetting the counting mechanism to an initial starting position, means for tensioning the wire intermittently during the wire laying movements of said wire laying member.

43. In combination, a wire laying member, a stator supporting member, means for effecting a relative oscillatory movement therebetween, actuating means for said first named means, a cycle counting mechanism driven thereby, means controlled by the cycle counting mechanism for increasing said oscillatory movement during the period said members are being actuated, other means controlled by the cycle counting mechanism for arresting movement of said members and means for interrupting said arresting means to cause the relative oscillatory movement to be prolonged through one-half a cycle.

44. In a winding machine of the character described, the combination of means for supporting the stator, a wire laying member, means for imparting relative oscillatory reciprocatory movement to the stator and wire laying member and means acting on the wire to tension the same intermittently during said relative movement.

In testimony whereof, I hereunto affix my signature.

ALBERT B. HERRICK.